United States Patent
Tatsumoto et al.

(10) Patent No.: US 9,966,767 B2
(45) Date of Patent: May 8, 2018

(54) CHARGE CONTROL DEVICE AND IMAGE FORMING APPARATUS INCLUDING CHARGE CONTROL DEVICE

(71) Applicant: Konica Minolta, Inc., Chiyoda-ku, Tokyo (JP)

(72) Inventors: Yuhei Tatsumoto, Toyokawa (JP); Tomonobu Tamura, Toyokawa (JP); Satoshi Teshima, Okazaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 149 days.

(21) Appl. No.: 14/693,099

(22) Filed: Apr. 22, 2015

(65) Prior Publication Data
US 2015/0311731 A1    Oct. 29, 2015

(30) Foreign Application Priority Data
Apr. 25, 2014  (JP) ................. 2014-091366

(51) Int. Cl.
*H02J 7/00* (2006.01)
*G03G 15/00* (2006.01)

(52) U.S. Cl.
CPC .......... *H02J 7/0021* (2013.01); *G03G 15/80* (2013.01); *H02J 7/007* (2013.01); *H02J 7/0019* (2013.01)

(58) Field of Classification Search
CPC ..................................... H02J 7/0021
USPC ....................................... 320/116
See application file for complete search history.

(56) References Cited

U.S. PATENT DOCUMENTS

| | | | | |
|---|---|---|---|---|
| 4,318,608 A | * | 3/1982 | Payne ............... | G03G 15/0283 399/196 |
| 5,530,335 A | * | 6/1996 | Decker ............... | G05F 1/67 136/293 |
| 5,955,867 A | * | 9/1999 | Cummings ........ | H02J 7/0011 320/107 |
| 7,745,025 B2 | * | 6/2010 | Leach ................ | H02J 7/0018 320/101 |
| 8,816,646 B2 | * | 8/2014 | Kamijima .......... | H02J 7/0013 320/121 |

(Continued)

FOREIGN PATENT DOCUMENTS

| | | |
|---|---|---|
| JP | 08-308123 A | 11/1996 |
| JP | 2006-165383 A | 6/2006 |
| JP | 2013-025280 A | 2/2013 |

*Primary Examiner* — Drew A Dunn
*Assistant Examiner* — Jerry D Robbins
(74) *Attorney, Agent, or Firm* — Buchanan Ingersoll & Rooney PC

(57) ABSTRACT

A charge control device uses external electricity to charge a plurality of battery devices. A constant current source uses the external electricity to generate and adjust an output current amount to a constant target value. A selector selects one battery device from the plurality of battery devices and supplies output current from the constant current source to the one battery device. A measurer measures an amount of actual current flowing from the constant current source to the one battery device. An instructor monitors a measured value provided by the measurer and instructs the selector, when the measured value meets a condition for a reduction of charging current amount to be regarded as having occurred, to change a destination to which the output current of the constant current source is supplied from the one battery device to a different battery device.

18 Claims, 15 Drawing Sheets

(56) References Cited

U.S. PATENT DOCUMENTS

| | | | |
|---|---|---|---|
| 2009/0284225 A1* | 11/2009 | Nakanuma | G06F 1/1626 320/134 |
| 2013/0206199 A1* | 8/2013 | Lassiter | H01L 31/058 136/206 |
| 2014/0097786 A1* | 4/2014 | Grimes | H02S 10/30 320/101 |

* cited by examiner

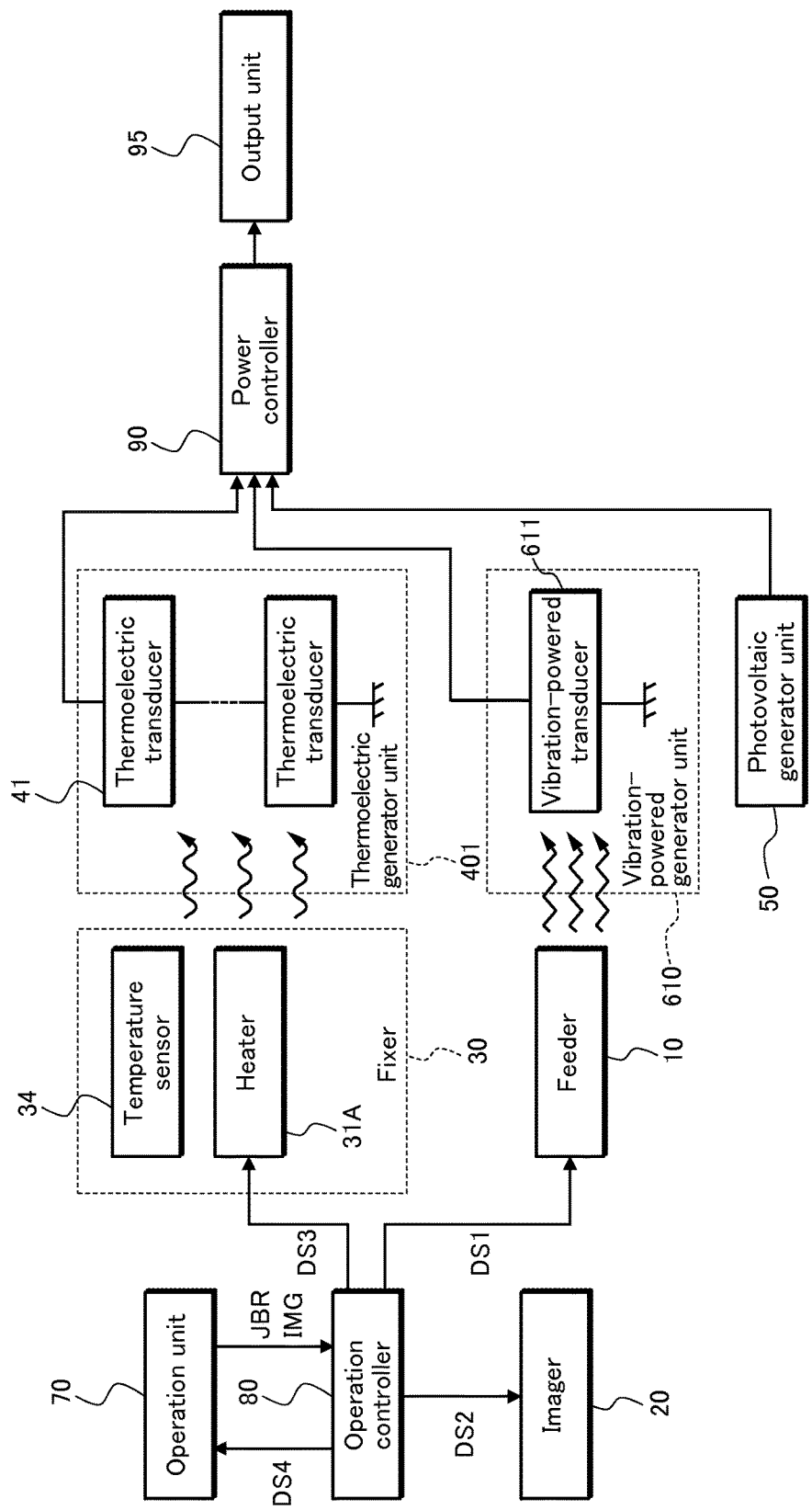

| Charging current target value [A] | Boundary charge amount [%] | | |
|---|---|---|---|
| | Generator A | Generator B | Generator C |
| 1.0 | 90 | 90 | 90 |
| 2.0 | 75 | 80 | 75 |
| 3.0 | 65 | 70 | 65 |

| Charge amount [%] at present time | | |
|---|---|---|
| Generator A | Generator B | Generator C |
| 60 | 80 | 60 |

FIG.12A

| Operation mode | First thermoelectric generator unit Fixer | Second thermoelectric generator unit Discharge tray | Vibration-powered generator unit Feeder | Photovoltaic generator unit ADF upper surface |
|---|---|---|---|---|
| Sleep | × | × | × | ○ |
| Run (start of printing) | ○ | × | ○ | ○ |
| Run (during printing) | ○ | ○ | ○ | ○ |
| Wait | ○ | × | × | ○ |

FIG.12B

| Operation mode change schedule | Predicted amount of power generation | Predicted target value of charging current amount [A] |
|---|---|---|
| Sleep | Small | 1.0 |
| Run (start of printing) | Medium | 2.0 |
| Run (during printing) | Large | 3.0 |
| Wait | Medium | 2.0 |
| Sleep | Small | 1.0 |

FIG.12C

| Predicted charge amount [%] | Pattern I | | | Pattern II | | |
|---|---|---|---|---|---|---|
| | Generator A | Generator B | Generator C | Generator A | Generator B | Generator C |
| Sleep | 80 | 70 | 60 | 80 | 70 | 60 |
| Run (start of printing) | 82 | 70 | 60 | 82 | 70 | 60 |
| Run (during printing) | 82 | 76 | 60 | 82 | 70 | 66 |
| Wait | 82 | 76 | 70 | | | |
| Sleep | 82 | 76 | 72 | | | |

CHARGE CONTROL DEVICE AND IMAGE FORMING APPARATUS INCLUDING CHARGE CONTROL DEVICE

This application is based on an application No. 2014-091366 filed in Japan, the contents of which are hereby incorporated by reference.

BACKGROUND OF THE INVENTION (1) Field of the Invention

The present invention relates to battery devices and charge control.

(2) Background

With recent increase in interest in energy conservation, energy harvesting is attracting attention. "Energy harvesting" is a technique of recovering and re-using as electrical power natural energy such as solar, wind, hydro, and geothermal energy, or energy such as vibrations, heat, light, and electromagnetic waves released into the surrounding environment from artificial systems such as machines and factories. Energy harvesting is expected to be of use not only in a power source for sensors, mobile devices, etc., but also in an auxiliary power source in equipment using a commercial power source as a primary power source. For example, the image forming apparatus disclosed in Japanese Patent Application Publication 2013-025280 reuses waste heat from a fixer by using a thermoelectric transducer in order to drive an exhaust fan or raise/maintain the temperature of the fixer.

Typical characteristics of energy harvesting are that power generation per generator element is low, in a µW to mW range, and that it is unstable, dependent on environmental conditions such as sunlight amount, weather, and ambient temperature. Based on these characteristics, power generation technology to which energy harvesting is applied typically uses maximum power point tracking (MPPT) in power control of a power generator, and a rechargeable battery in power supply to a load.

Charging of the rechargeable battery typically continues until the battery reaches the full charge. For examples, see Japanese Patent Application Publications H08-308123 and 2006-165383. This charging is controlled by a combination of constant-current charging and full charge detection by a $-\Delta V$ or $dT/dt$ scheme, or constant-current constant-voltage charging. Power stored in the battery is supplied to the load when required.

SUMMARY OF THE INVENTION

Charge control for the battery is performed, for example, by a constant-current constant-voltage scheme. In this scheme, constant current charging is performed while quantity of electric charge stored in the battery (hereafter, "charge amount") is low and therefore the battery voltage is sufficiently low with respect to an upper boundary of the charging voltage; the charging current amount is thus maintained at a constant target value. This is because increase in the charge amount causes increase in the battery voltage, and in order to match the increase, the charging voltage increases. At the end stage of the charging, the charging voltage reaches the upper boundary, and then the constant current charging is switched to a constant voltage charging to maintain the charging voltage at the upper boundary. At this time, the charging current amount decreases from the target value maintained during the constant current charging.

This decrease in the charging current amount causes the following kind of power loss (hereafter, "charging loss") to occur. Power supplied from an external power source is substantially equal to the product of the upper boundary of the charging voltage and the target value of the charging current amount. On the other hand, power stored in the battery is substantially equal to the product of the battery voltage and the actual value of the charging current amount. Accordingly, the decrease in the charging current amount from the target value at the end stage of the charging means that a portion of power supplied from the external power source is lost as heat, i.e. charging loss occurs.

From the perspective of energy conservation, it is desirable to reduce the charging loss regardless of the type of external power source. In particular, when an energy harvesting device is being used as an external power source, power loss due to factors other than the device, such as charging loss, must be reduced as much as possible in order to further improve power generation efficiency since a power generation amount per generator element is not easy to increase in energy harvesting.

The present invention has an aim of solving the technical problem described above, and in particular aims to provide a charge control device that reduces charging loss due to a reduction in charging current amount.

A charge control device according to one aspect of the present invention is a device for charging a plurality of battery devices by using external electricity, comprising: a constant current source configured to use the external electricity to generate and adjust an output current amount to a constant target value; a selector configured to select one battery device from the plurality of battery devices and to supply output current of the constant current source to the one battery device; a measurer configured to measure an amount of actual current flowing from the constant current source to the one battery device; and an instructor configured to monitor a measured value provided by the measurer and to instruct the selector, when the measured value meets a condition for a reduction of charging current amount to be regarded as having occurred, to change a destination to which the output current of the constant current source is supplied from the one battery device to a different battery device.

An image forming apparatus according to one aspect of the present invention is an apparatus comprising: a feeder configured to feed a sheet; an imager configured to form a toner image on a sheet fed by the feeder; a fixer configured to thermally fix the toner image formed by the fixer; a generator including an element for converting heat, light, electric waves, or vibration to electricity, the generator being configured to use waste heat from the fixer, irradiated light from outside, electric waves propagating through surrounding space, or vibration of the feeder to generate electricity; a plurality of battery units configured to store electricity provided from the generator; and a charge control device configured to use the electricity provided from the generator to charge the plurality of battery units. The charge control device includes a constant current source configured to use the electricity provided from the generator to generate and adjust an output current amount to a constant target value; a selector configured to select one battery unit from the plurality of battery units and to supply output current of the constant current source to the one battery unit; a measurer configured to measure an amount of actual current flowing from the constant current source to the one battery unit; and an instructor configured to monitor a measured value provided by the measurer and to instruct the selector, when the measured value meets a condition for a reduction of charging current amount to be regarded as having occurred, to change a destination to which the output current of the constant current source is supplied from the one battery unit to a different battery unit.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 5 is a function block diagram of the image forming apparatus illustrated in FIG. 1;

FIG. 9A illustrates when a monitored value is a difference between a target value and a measured value of the charging current amount, FIG. 9B illustrates when the monitored value is a rate of decrease of the measured value of the charging current amount, and FIG. 9C illustrates when the monitored value is the actual measured value of the charging current amount;

FIG. 12A is a table illustrating correspondence between operation modes of the image forming apparatus illustrated in FIG. 1 and power of generators; FIG. 12B is a table illustrating target values of charging current amounts and predicted power generation amounts for each planned operation mode of a given job; FIG. 12C is a table illustrating correspondence between patterns of selecting charging in each operation mode illustrated in FIG. 12B and a predicted charge amount, for each of the battery units illustrated in FIG. 7;

DETAILED DESCRIPTION

The following describes a preferred embodiment of the present invention with reference to the drawings.

Overview of Configuration of Image Forming Apparatus

Figure 1:
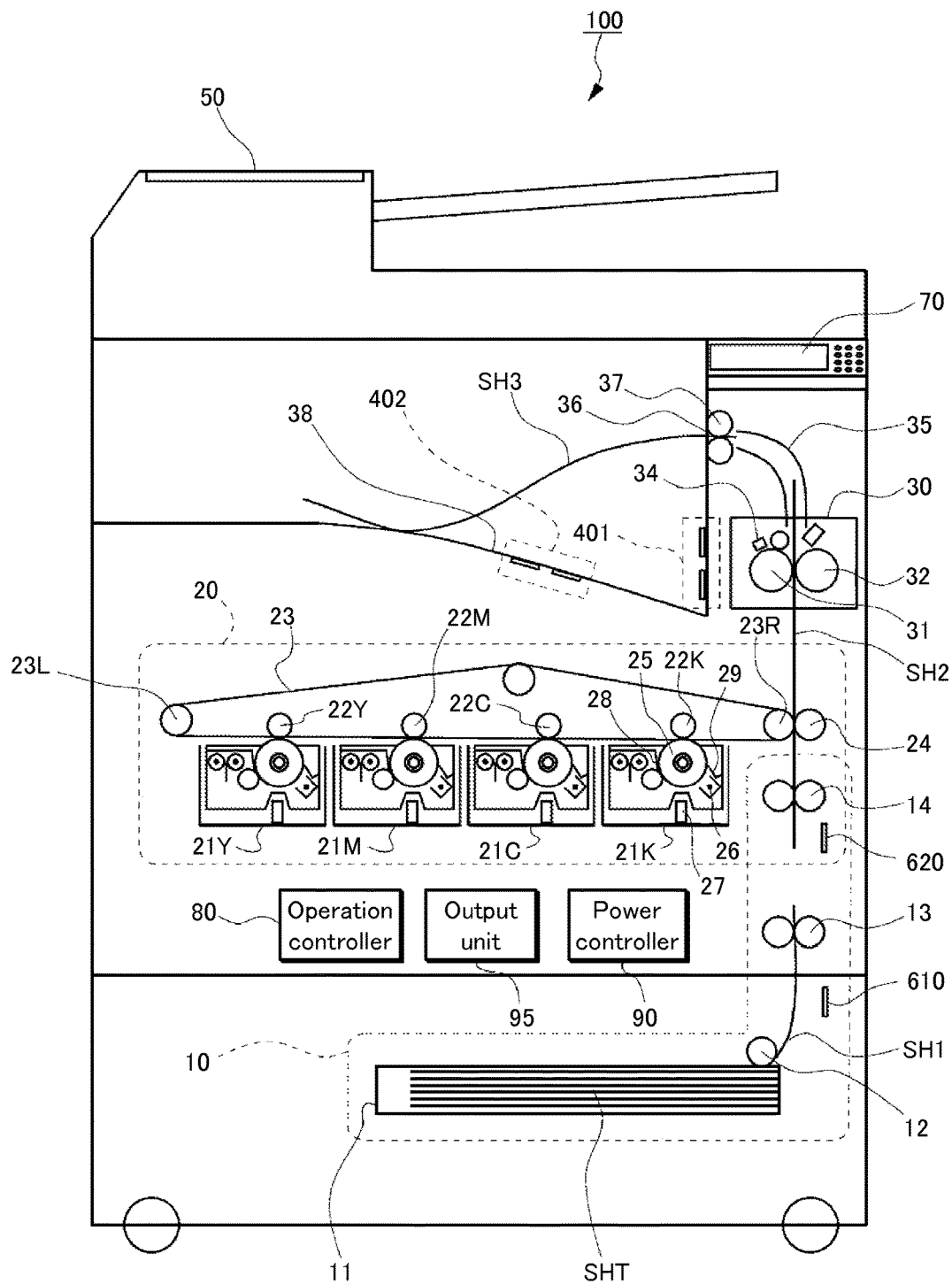
FIG. 1 is a schematic frontal view illustrating a configuration of an image forming apparatus according to an embodiment of the present invention.

FIG. 1 is a schematic frontal view illustrating a configuration of an image forming apparatus according to an embodiment of the present invention. Internal elements of an image forming apparatus 100 in FIG. 1 are drawn to be visible as if a front of a housing is transparent.

Referring to FIG. 1, the image forming apparatus 100 is, for example, a color laser printer, and includes a feeder 10, an imager 20, a fixer 30, generators 401, 402, 50, 610, and 620, an operation unit 70, an operation controller 80, a power controller 90, and an output unit 95. The feeder 10 feeds sheets SHT, sheet by sheet, to the imager 20. The imager 20 forms a toner image on a sheet SH2 fed from the feeder 10. The fixer 30 thermally fixes the toner image. The generators 401, . . . , 620 generate electricity by using surrounding heat, light, and vibrations. The operation unit 70 receives a print request (hereinafter, "job") via an operation performed by a user or communication with an external electronic device, and communicates the job to the operation controller 80. The operation controller 80, the power controller 90, and the output unit 95 are electrical circuitry on one layer of substrate. The operation controller 80, based on information from the operation unit 70, controls other internal elements of the image forming apparatus 100. The power controller 90 controls power outputted from the generators 401, . . . , 620. The output unit 95 stores and outputs the power. The outputted power is, for example, used as standby power for the operation unit 70, the operation controller 80, and the power controller 90, or auxiliary power during power outages.

Feeder

Referring to FIG. 1, the feeder 10 includes a storage tray 11, a feeding roller 12, a transport roller 13, and a timing roller 14. The storage tray 11 is in a lower part of the image forming apparatus 100, and can store the sheets SHT. Material of the sheets SHT is, for example, paper or resin. The feeding roller 12 feeds a sheet SH1, which is a topmost sheet of the sheets SHT, towards the transport roller 13. The sheet SH1 is further transported by the transport roller 13 to the timing roller 14. The timing roller 14 is typically stopped at a time of starting such sheet transport, and starts rotating in response to a drive signal from the operation controller 80. In this way, the sheet SH2 transported from the transport roller 13 is fed to the imager 20 from the timing roller 14 at a timing indicated by the drive signal.

Imager

Referring to FIG. 1, the imager 20 includes four imaging units 21Y, 21M, 21C, and 21K, four primary transfer rollers 22Y, 22M, 22C, and 22K, an intermediate transfer belt 23, and a secondary transfer roller 24. The imaging units 21Y, . . . , 21K are arranged at predefined intervals along a horizontal direction. The primary transfer rollers 22Y, . . . , 22K are arranged opposite respective ones of the imaging units 21Y, ..., 21K in the vertical direction. The intermediate transfer belt 23 is suspended around a roller 23L and a roller 23R and rotates along with rotation of the roller 23L and the roller 23R. A portion of the intermediate transfer belt 23 that is suspended in the horizontal direction passes between the imaging units 21Y ..., 21K and the primary transfer rollers 22Y, ..., 22K. When the intermediate transfer belt 23 rotates, each portion of a surface of the intermediate transfer belt 23 contacts the primary transfer rollers 22Y, ..., 22K in order. The secondary transfer roller 24 is arranged parallel to the roller 23R that is one of the two rollers that the intermediate transfer belt 23 is suspended around, and sandwiches the intermediate transfer belt 23 between the secondary transfer roller 24 and the roller 23R. The sheet SH2 fed from the timing roller 14 is fed through a contact portion between the intermediate transfer belt 23 and the secondary transfer roller 24, i.e., a nip.

The imaging units 21Y, 21M, 21C, and 21K form, in order, yellow (Y), magenta (M), cyan (C), and black (K) toner images based on image data. Each imaging unit has identical configuration, and each includes a photosensitive drum 25, a charger 26, an exposure unit 27, a developing unit 27, a cleaner 29, and an eraser lamp (not illustrated in FIG. 1). Outer circumferences of the photosensitive drums 25 are surrounded by the chargers 26, etc. The chargers 26 uniformly charge facing portions of outer circumferential surfaces of the photosensitive drums 25. The exposure units 27 include light-emitting elements and lenses. The light-emitting elements are, for example, laser diodes. The exposure units 27 use the light-emitting elements and the lenses to expose charged portions of the outer circumferential surfaces of the photosensitive drums 25. At such time, charge is neutralized in areas on which light is incident. Shape of the areas is determined according to the drive signal from the control unit 50. In this way, the areas remain on the outer circumferential surfaces as electrostatic latent images. The developing units 28 develop by depositing toner of a color assigned to the imaging units 21Y, ..., 21K on the electrostatic latent images. The cleaners 29 remove remaining toner from portions of the outer circumferential surfaces of the photosensitive drums 25 immediately after contact with the intermediate transfer belt 23. The eraser lamps eliminate charge by irradiating facing portions of the outer circumferential surfaces of the photosensitive drums 25 with uniform light.

Primary transfer voltages are applied to the primary transfer rollers 22Y, ..., 22K, and therefore electric fields are generated where the primary transfer rollers 22Y, ..., 22K and the photosensitive drums 25 face each other with the intermediate transfer belt 23 sandwiched in-between. The electric fields transfer toner images to a surface of the intermediate transfer belt 23 from the photosensitive drums 25. The imaging units 21Y, ..., 21K shift timing of each imaging operation to conform to rotation of the intermediate transfer belt 23. As a result, toner images of each color assigned to the imaging units 21Y, ..., 21K are superimposed by multiple transfers, in order, from the photosensitive drums 25 onto the same position on the surface of the intermediate transfer belt 23. In this way, a color toner image is formed on the surface of the intermediate transfer belt 23.

A secondary transfer voltage is applied to the secondary transfer roller 24, and therefore an electric field is generated between the secondary transfer roller 24 and the intermediate transfer belt 23. When the sheet SH2 is passed through the nip between the intermediate transfer belt 23 and the secondary transfer roller 24, the electric field transfers the color toner image from the intermediate transfer belt 23 to a surface of the sheet SH2. Subsequently, the secondary roller 24 feeds the sheet SH2 to the fixer 30.

Fixer

Referring to FIG. 1, the fixer 30 includes a fixing roller 31, a pressure roller 32, and a temperature sensor 34. The fixing roller 31 and the pressure roller 32 are arranged in parallel in contact with each other. The sheet SH2 fed from the imager 20 is passed through a contact point, i.e., nip, between the fixing roller 31 and the pressure roller 32. While rotating, the fixing roller 31 contacts, at a side surface thereof, the surface of the sheet SH2 passing through the fixing nip. The fixing roller contains a heater such as a halogen lamp, and transmits heat emitted from the heater to a portion of the sheet SH2 in contact with the side surface. The pressure roller 32 applies pressure to the portion of the sheet SH2, and presses it against the fixing roller 31. When a portion of the sheet SH2 where a toner image is formed by the imager 20 is passed through the fixing nip, the toner image is fixed on the surface of the sheet SH2 by heat from the fixing roller 31 and pressure from the pressure roller 32. The temperature sensor 34, which is positioned in a vicinity of a central portion of the fixing roller 31, measures temperature of the fixing roller 31 and notifies the operation controller 80 of the temperature. The measured value of the temperature is used by the operation controller 80 to control a heating amount of the halogen lamp, i.e., in temperature control.

After receiving a heat fixing process at the fixer 30, the sheet SH2 is guided by a guide board 35 toward a discharge opening 36 from an upper portion of the fixer 30. A pair of discharge rollers 37 are arranged in parallel at an inner side of the discharge opening 36 and are in contact with each other at side surfaces thereof. A sheet SH3 passes through the nip, guided by the guide board 35. While rotating, the discharge rollers 37 use their side surfaces to feed the sheet SH3 passed through their nip from the discharge opening 36 to the discharge tray 38. The discharge tray 38 is positioned outside the body of the image forming apparatus 100 and stacks the sheet SH3 discharged from the discharge opening 36.

Generators

The generators 401, ..., 620 each use an element for energy harvesting to create electrical power from heat, light, or vibrations emitted into the surrounding environment by the image forming apparatus 100. The generators include thermoelectric generator units 401, 402, a photovoltaic generator unit 50, and vibration-powered generator units 610, 620. The thermoelectric generator units 401, 402 use thermoelectric transducers to recover heat from the fixer 30 or the sheet SH3 on the discharge tray 38 as electrical power. The photovoltaic generator unit 50 uses a solar cell to recover natural light or artificial light incident on an upper surface of the image forming apparatus 100 as electrical power.

The vibration-powered generator units 610, 620 use vibration-powered generator elements to recover vibrations of the feeder 10 as electrical power.

Thermoelectric Generator Unit

Referring to FIG. 1, the thermoelectric generator units include two thermoelectric generator units 401 and 402. The first thermoelectric generator unit 401 is installed on an outer surface of a portion of the body of the image forming apparatus 100; the portion has an inner side facing the fixer 30. The second thermoelectric generator unit 402 is embedded in an upper surface of the discharge tray 38.

The portion of the body of the image forming apparatus 100 where the first thermoelectric generator unit 401 is installed is suitable for installation of thermoelectric transducers because of the following two points: (A1) the location is maintained at a temperature sufficiently higher than room temperature due to waste heat from the fixer 30, and accordingly, outputted electrical power of the thermoelectric transducer is high; (A2) even when the thermoelectric transducer absorbs heat at the location, temperature of the fixing nip of the fixer 30 does not change, and accordingly, the first thermoelectric generator unit 401 can be used while maintaining a high quality of printing.

In the upper surface of the discharge tray 38, the portion where the second thermoelectric generator unit 402 is embedded is covered by the sheet SH3 discharged from the discharge opening 36. The sheet SH3 has a high temperature due to heat received from the fixer 30, and therefore the second thermoelectric generator unit 402 is maintained at a temperature sufficiently higher than room temperature by contact with the sheet SH3. Accordingly, outputted electrical power of the thermoelectric transducer is high.

The thermoelectric transducers each include a matrix of P-type semiconductor elements and N-type semiconductor elements between two layers of substrate. In the matrix, the P-type semiconductor elements and the N-type semiconductor elements are adjacent to each other and alternate. Each substrate is composed of an insulator, for example ceramic, and the P-type semiconductor elements and the N-type semiconductor elements are, for example, bismuth (Bi)-tellurium (Te) based semiconductors lightly doped with antimony (Sb) and selenium (Se), respectively. Conductive layers are formed in opposing faces of the two layers of substrate, a conductive layer connecting an upper end of a P-type semiconductor element to an adjacent upper end of an N-type semiconductor element and another conductive layer connecting a lower end of the P-type semiconductor element to an adjacent lower end of a different N-type semiconductor element. In this way, all P-type semiconductor elements and N-type semiconductor elements are alternately connected in series.

Figure 2A:
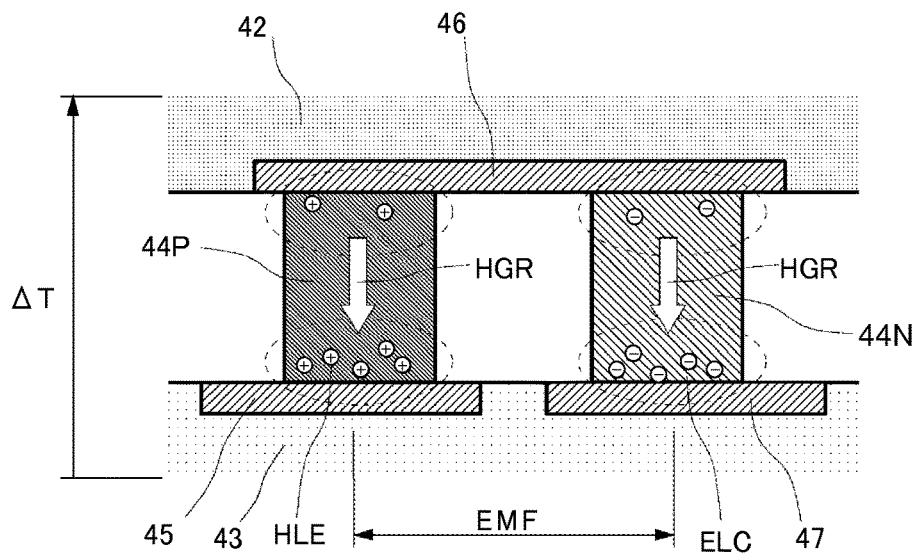
FIG. 2A is a schematic cross-section of a thermoelectric transducer including a pair of neighboring semiconductor elements.

FIG. 2A is a schematic cross-section of a thermoelectric transducer including a pair of neighboring semiconductor elements 44P and 44N. Referring to FIG. 2A, one substrate 42 of the two layers of substrate is in contact with a surface of the body of the image forming apparatus 100 and absorbs heat from the fixer 30 or the sheet SH3 on the discharge tray 38, and the other substrate 43 is exposed to external space and releases waste heat to the external space. Then, a temperature difference $\Delta T$ occurs between the substrates 42, 43, and therefore inside each of the semiconductor elements 44P, 44N, as indicated by an arrow HGR in FIG. 2A, a heat gradient occurs from the substrate 42 having a high temperature to the substrate 43 having a low temperature. The heat gradient causes concentration of carriers, i.e. holes HLE and electrons ELC, at the low temperature side, causing a potential difference across each of the semiconductor elements 44P, 44N (Seebeck effect). Because all the semiconductor elements 44P, 44N are connected in series by the conductive layers, the total sum of the potential difference in all the semiconductor elements 44P, 44N appears as an electromotive force (EMF) across the series connection of the semiconductor elements 44P, 44N. In this way, the thermoelectric transducers convert external waste heat into DC power.

Figure 2B:
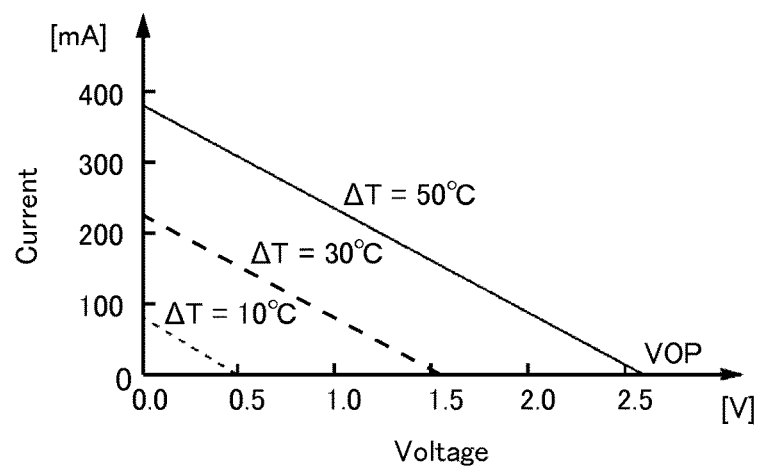
FIGS. 2B and 2C are graphs illustrating a current-voltage characteristic curve and a power-voltage characteristic curve of the thermoelectric transducer.
Figure 2C:
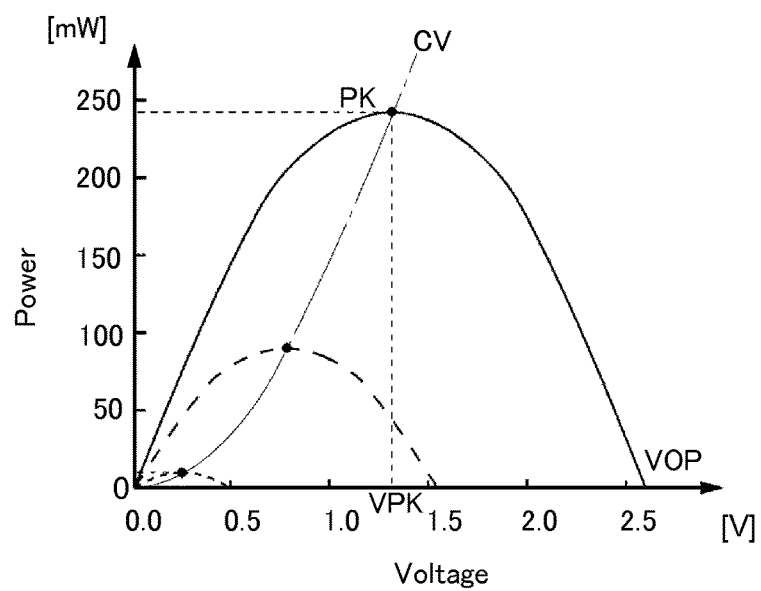

FIGS. 2B and 2C are graphs illustrating a current-voltage characteristic curve and a power-voltage characteristic curve of the thermoelectric transducer. Referring to FIG. 2B, the thermoelectric transducer causes its output current to have a substantially linear decrease (i.e. a decrease that is linear within an acceptable range) with an increase in its output voltage. As illustrated in FIG. 2C, the power-voltage characteristic curve is thus expressed, substantially, as an upwardly convex parabola. The apex PK of the parabola or the pair of a voltage value VPK and a current value at the output of power of the maximum value represented by the apex PK is referred to as a "maximum power point". The voltage value VPK at the maximum power point is substantially equal to 50% of an open-circuit voltage VOP: VPK=VOP/2. The "open-circuit voltage" is a voltage value at the output terminal of the thermoelectric transducer that is disconnected from the load and then open; the open-circuit voltage is equal to the voltage value VOP where the characteristic curves illustrated in FIGS. 2B and 2C intersect the axes "current=0 mA" and "power=0 mW" except for the origin. Referring further to FIGS. 2B and 2C, both the current-voltage and power-voltage characteristics of the thermoelectric transducer vary depending on the temperature difference $\Delta T$ between the two substrates 42 and 43. As the temperature difference $\Delta T$ changes, the maximum power point PK is thus displaced along a dashed line CV illustrated in FIG. 2C.

Photovoltaic Generator Unit

Referring to FIG. 1, the photovoltaic generator unit 50 is embedded in an upper surface of an automatic document feeder (ADF) mounted on an upper portion of the image forming apparatus 100. The photovoltaic generator unit 50 converts natural light or artificial light incident on the upper surface into electrical power via a solar cell.

Figure 3A:
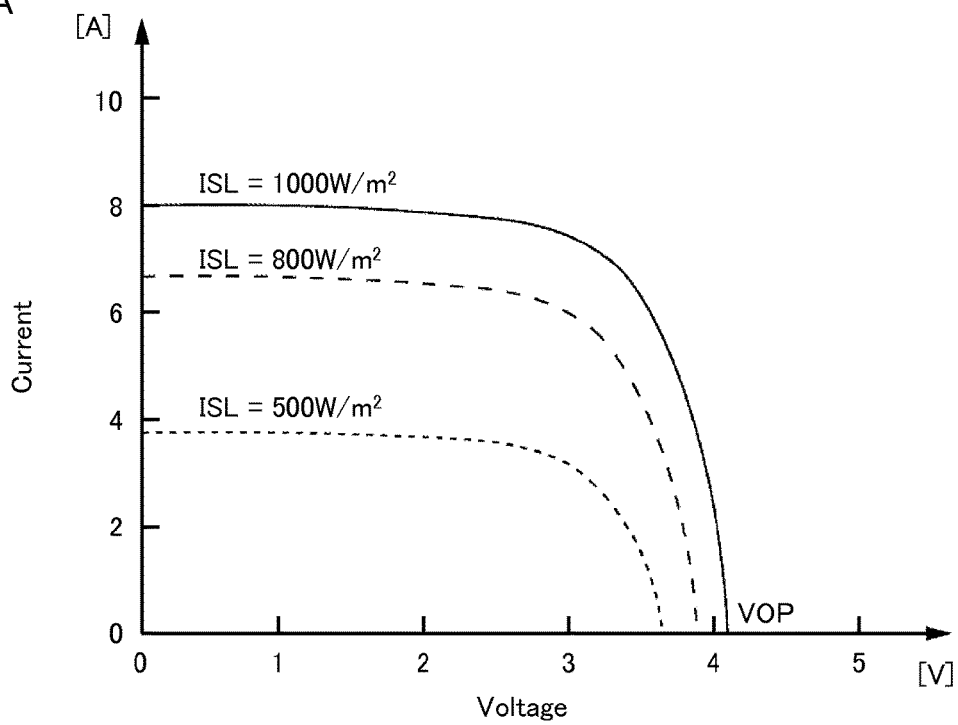
FIGS. 3A and 3B are graphs illustrating a current-voltage characteristic curve and a power-voltage characteristic curve of a solar cell included in a photovoltaic generator unit.
Figure 3B:
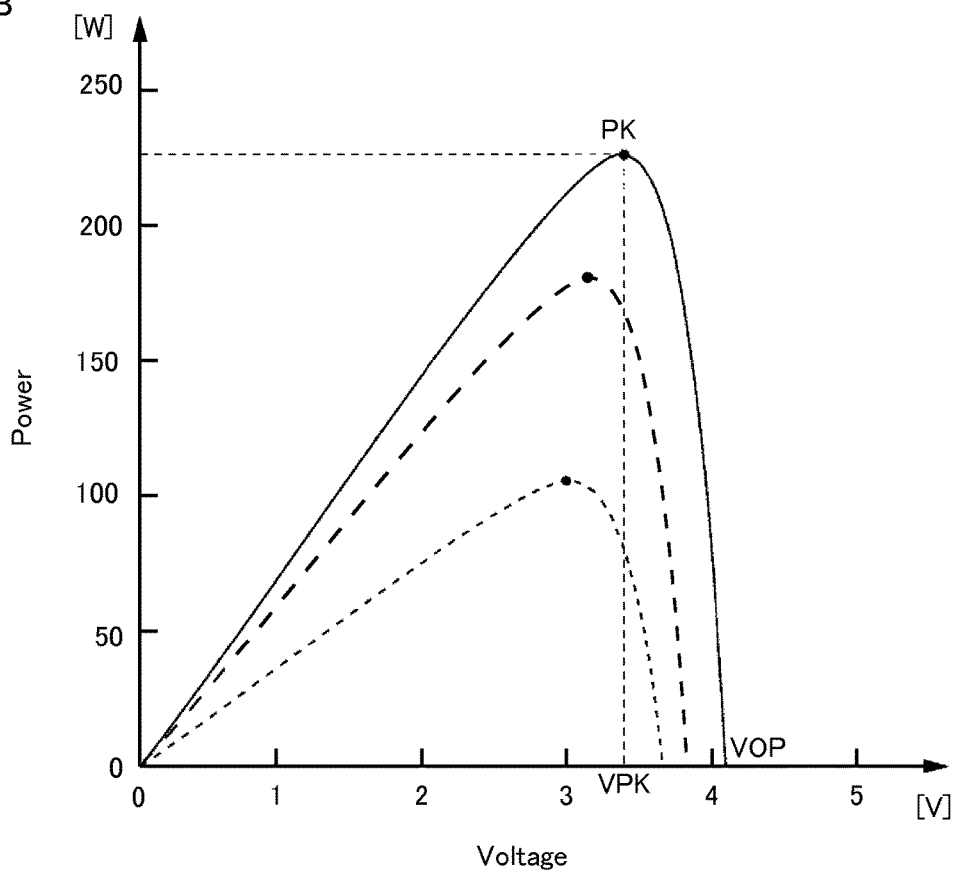

FIGS. 3A and 3B are graphs illustrating a current-voltage characteristic curve and a power-voltage characteristic curve of a solar cell contained in the photovoltaic generator unit 50. Referring to FIG. 3A, output current of the solar cell is maintained at a substantially constant amount in a broad range of output voltage, and rapidly decreases where the output voltage is near the open-circuit voltage VOP, for example, 60%-70% of the open-circuit voltage VOP. As illustrated in FIG. 3B, the maximum power point PK thus occurs where the output voltage approaches a value VPK that is comparatively near the open-circuit voltage VOP. Referring further to FIGS. 3A and 3B, the current-voltage and power-current characteristics of the solar cell vary according to an amount of incident light ISL, and therefore the maximum power point PK is displaced along with changes in the amount of incident light ISL.

Vibration-Powered Generator Unit

Referring to FIG. 1, the vibration-powered generator units includes two located in the feeder 10; the first vibration-powered generator unit 610 is installed near the storage tray 11, and the second vibration-powered generator unit 620 is installed near the imager 20. Their locations vibrate considerably each time the feeder 10 drives various rollers 12, 13, and 14 to feed sheets SH1 and SH2 from the storage tray 11 to the imager 20. Accordingly, output power of the vibration-powered generator units 610, 620 is sufficiently high.

Figure 4A:
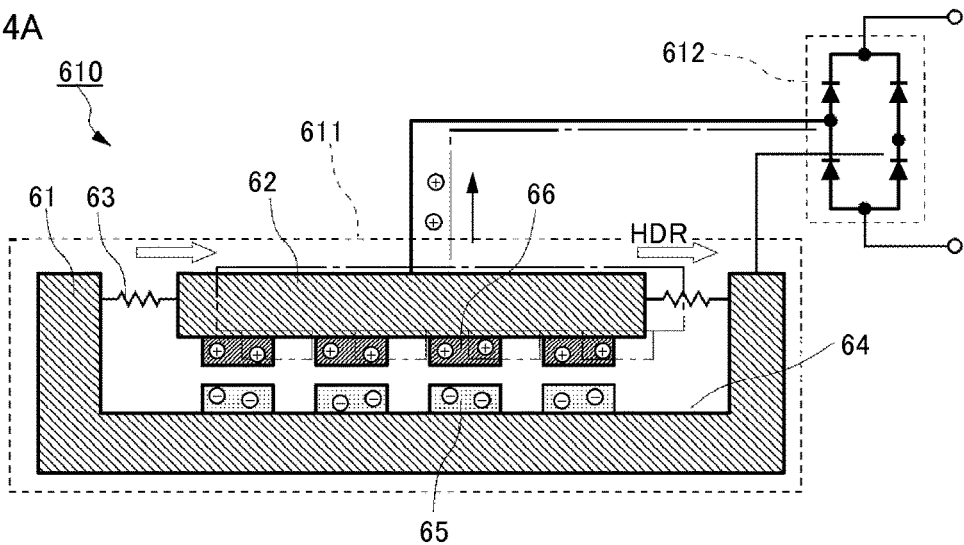
FIG. 4A is a schematic diagram illustrating a configuration of a vibration-powered generator unit.

FIG. 4A is a schematic diagram illustrating a configuration of the first vibration-powered generator unit 610. Since the second vibration-powered generator unit 620 has the same configuration, the following description about the first vibration-powered generator unit 610 will be applied to the configuration of both the vibration-powered generator units. Referring to FIG. 4A, the first vibration-powered generator unit 610 uses electrostatic induction, and includes a vibration transducer 611 and a rectifier circuit 612. The vibration transducer 611 includes a base body 61, a movable portion 62, and a support unit 63. These structures are fabricated in one semiconductor substrate by using semiconductor integration techniques (MEMS process). The base body 61 is the one semiconductor substrate, and includes a concave portion 64 in an upper surface thereof. The concave portion 64 has a plurality of strips of electrets 65 arranged on its bottom surface in equidistant intervals in a direction perpendicular to their longitudinal direction, which corresponds to the direction perpendicular to the paper surface in FIG. 4A. "Electret" means a dielectric body in which electrical polarization lasts semi-permanently even after an external electrical field is removed, and in particular a dielectric body that produces a relatively strong surrounding electric field. The movable portion 62 is a plate-like member, ends of which are connected to an upper surface of the base body 61 by the support unit 63, supported in a floating state in the concave portion 64 of the base body 61. The movable portion 62 has a plurality of strips of electrodes 66 arranged on its lower surface in equidistant intervals in a direction perpendicular to their longitudinal direction; the strips of electrodes 66 face the electrets 65. Because the electric field formed by charges in the electrets 65 causes electrostatic induction in the electrodes 66, charges of opposite polarity accumulate at surfaces of the electrodes 66. The support unit 63 is a spring, suspending the movable portion 62 in the concave portion 64 of the base body 61 while allowing movement of the movable portion 62 in a direction parallel to the bottom surface of the concave portion 64. When the vibration-powered generator unit 611 is subjected to an external vibration, the movable portion 62 vibrates in the direction indicated by an arrow HDR in FIG. 4A, and therefore the electrodes 66 on the lower surface of the movable portion 62 are displaced relative to the electrets 65. Then, electric field that the electrodes 66 receive from the electrets 65 changes to rearrange charges in the surfaces of the electrodes 66, and thus an electromotive force PW is generated at the electrodes 66. Polarity of the electromotive force PW is reversed in synchronization with the vibration of the movable portion 62. The rectifier circuit 612 connects the base body 61 and the movable portion 62 of the vibration transducer 611, and converts alternating current generated by the electromotive force PW to direct current, and outputs the direct current.

Figure 4B:
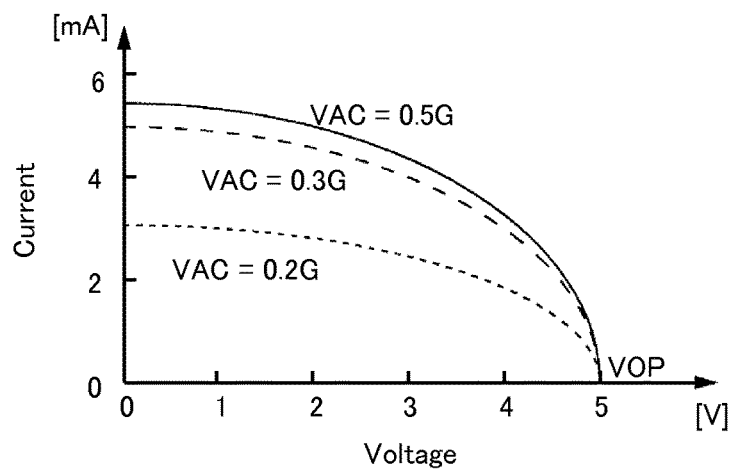
FIGS. 4B and 4C are graphs illustrating a current-voltage characteristic curve and a power-voltage characteristic curve of a vibration-powered generator element included in a vibration-powered generator unit.
Figure 4C:
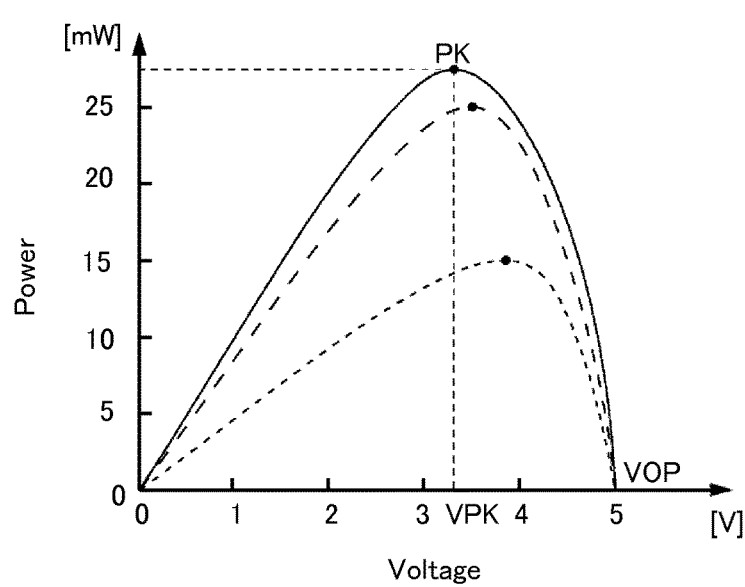

FIGS. 4B and 4C are graphs illustrating a current-voltage characteristic curve and a power-voltage characteristic curve of the vibration transducer 611. Referring to FIG. 4B, as output voltage of the vibration transducer 611 increases, output current decreases. The rate of decrease increases as the output voltage increases. Accordingly, as illustrated in FIG. 4C, the maximum power point PK occurs where the output voltage approaches a value VPK that is comparatively near to the open-circuit voltage VOP. Referring again to FIGS. 4B and 4C, current-voltage characteristics and power-voltage characteristics of the vibration transducer 611 vary according to a magnitude VAC of external vibration, and therefore position of the maximum power point PK changes along with changes in the magnitude.

Operation Controller

The operation controller 80 includes a CPU, RAM, and ROM. The CPU controls other functional units in the image forming apparatus 100 in accordance with firmware. The RAM provides the CPU with a workspace for execution of the firmware. The ROM includes non-writable memory and rewritable memory, such as EEPROM. The non-writable memory stores the firmware and the rewritable memory provides the CPU with a storage area for environmental variables, etc.

FIG. 5 is a function block diagram of the image forming apparatus 100. Note that, of the generators illustrated in FIG. 1, the second thermoelectric generator unit 402 and the second vibration-powered generator unit 620 are not illustrated in FIG. 5. Referring to FIG. 5, in accordance with firmware, the operation controller 80 first causes the operation unit 70 to accept a job request JBR or image data IMG from a user or network. The operation controller 80 subsequently controls operation of the feeder 10, the imager 20, the fixer 30, the power controller 90, the output unit 95, and other functional units of the image forming apparatus 100, based on the job request JBR. Specifically, the operation controller 80 sends drive signals DS1-DS4 to the functional units, indicating an operation mode to be selected at the present time. For example, the operation controller 80 expresses a type of operation mode to be indicated as an environmental variable, prompting each functional unit to reference the environmental variable. In this way, the operation controller 80 causes each functional unit to begin processing according to the indicated operation mode.

Figure 6:
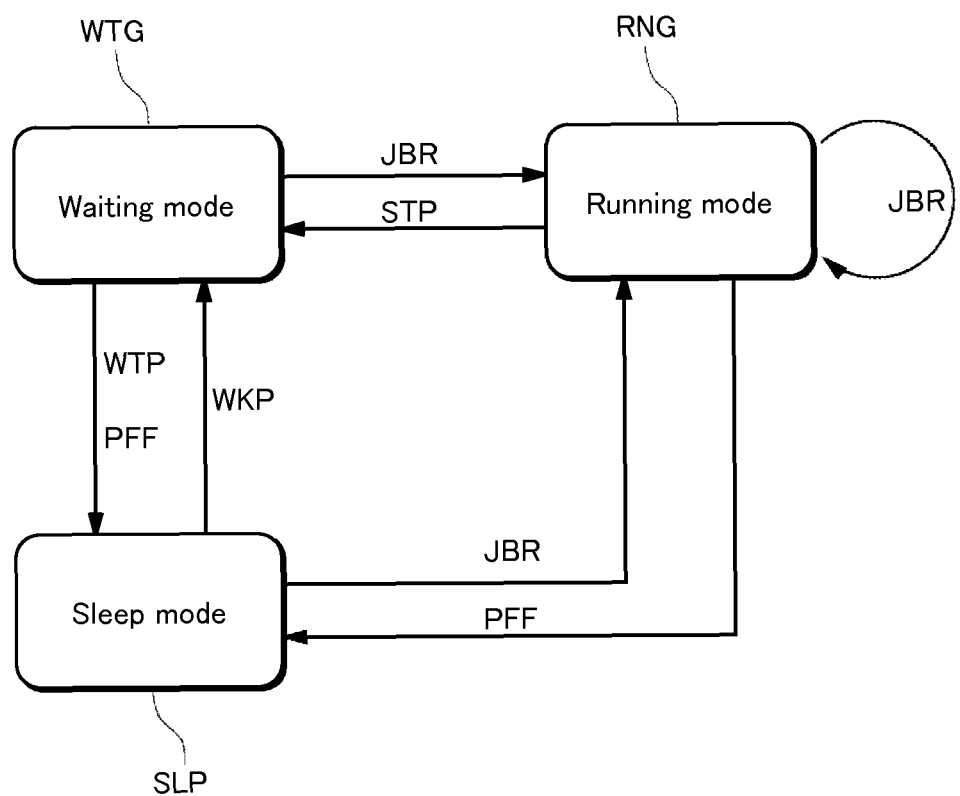
FIG. 6 is a state transition diagram of the image forming apparatus illustrated in FIG. 1.

FIG. 6 is a state transition diagram of the image forming apparatus 100. Referring to FIG. 6, the operation modes of the image forming apparatus 100 are broadly classified into three types: a running mode RNG, a waiting mode WTG, and a sleep mode SLP. In the running mode RNG, which is also referred to as a continuous printing mode, printing of sheets is executed. In this mode, the feeder 10 continuously feeds a required number of sheets, the imager 20 repeatedly forms toner images and transfers them to sheets, and the fixer 30 continuously heats and applies pressure to the sheets. In the waiting mode WTG, a state ready to print sheets is prepared and maintained. In this mode, the feeder 10 and the imager 20 stop, and the fixer 30 preheats the fixing roller 31 to an appropriate temperature and maintains the temperature. In the sleep mode SLP, power consumption is kept to a necessary minimum. In this mode, in addition to the feeder 10 and the imager 20, the fixer 30 also stops, in particular, power supply is cut off to a built-in heater 31A.

The operation controller 80 updates a value of an environmental variable indicating an operation mode at the present time according to an event occurring in the image forming apparatus 100. In this way, each operation mode RNG, WTG, SLP, transitions to another mode. For example, the running mode RNG transitions to the waiting mode WTG in response to a stop event STP, and transitions to the sleep mode SLP in response to a power-off event PFF. A stop event STP includes job completion, a press of a stop button, and receiving a stop instruction from a network. A power-off event PFF includes a press of a power-off button. The running mode RNG also continues when a new job request JBR occurs. The waiting mode WTG transitions to the running mode RNG in response to a job request JBR, and transitions to the sleep mode SLP in response to a waiting period expiration WTP or a power-off event PFF. The sleep mode SLP transitions to the running mode RNG in response to a job request JBR, and transitions to the waiting mode WTG in response to a wake-up event WKP. A wake-up event WKP includes a press of any button, contact with the touch panel, and reception of a wake-up instruction from a network.

The operation controller 80 also provides necessary information for each operation mode to the functional units. For example, the operation controller 80 provides instructions indicating the running mode RNG as follows. To the feeder 10, the operation controller 80 transmits the drive signal DS1 indicating information that the operation controller 80 has determined; the information includes a type and number of sheets to be continuously fed, the timing at which rotation of the timing roller 14 is to be begun, etc. To the imager 20, the operation controller 80 transmits the drive signal DS2 indicating information that the operation controller 80 has determined based on the image data IMG; the information includes information related to a toner image to be formed on the photosensitive drum 25 of each imaging unit 22Y, ..., 22K, and the time when the toner image is to be formed. To the fixer 30, the operation controller 80 first requests a measured value of the temperature sensor 34, then transmits the drive signal DS3 indicating information that the operation controller 80 has determined based on the measured value; the information includes a temperature control amount for the fixing roller 31, i.e. a heating amount of the heater 31A.

The operation controller 80 also monitors power generation amounts of the generators via the power controller 90, and notifies the output unit 95 of the values and changes of the power generation amounts.

Power Controller

Referring again to FIG. 5, the power controller 90 performs MITT control for each of the generators 401, 610, 50. Here, "MITT control" means determining displacement of a maximum power point of a generator from changes in environmental conditions or power generation amount of the generator, and then adjusting output of the generator so as to track the displacement. A "maximum power point" is a peak that appears in power-voltage characteristics of a generator; the point shows the output voltage and output power of the generator whose power generation amount is equal to the maximum output power. The maximum power point is greatly displaced by variation of environmental conditions. For example, thermoelectric transducers have maximum power points dependent on temperature, and solar cells have maximum power points dependent on an amount of sunlight. MPPT control maintains output of a generator at the maximum power point regardless of variation in environmental conditions, thus increasing power generation efficiency.

The power controller 90 is connected in parallel to output ends of a plurality of generators, monitors output voltage and output current of each of the generators, and indexes displacement of the maximum power points of each of the generators. Known methods such as the hill climbing method are used in calculation of the maximum power point. The power controller 90 further adjusts the output voltage and output current of each generator to track displacement of the maximum power point.

The power controller 90 also notifies the operation controller 80 of power generation amounts of the generators periodically, or whenever there is a large change in power generation amount of any of the generators.

Output Unit

Figure 7:
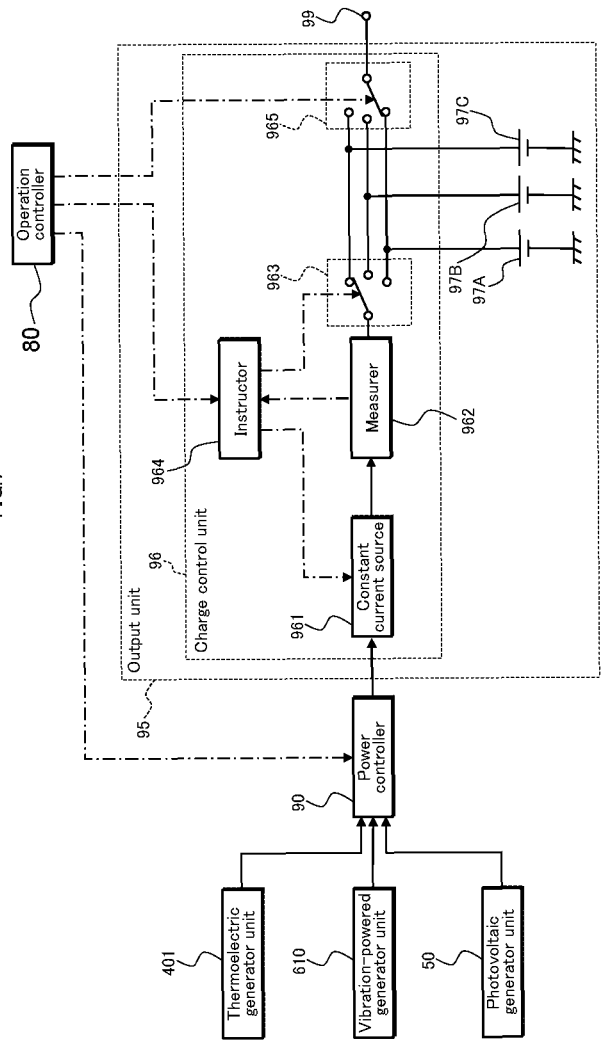
FIG. 7 is a function block diagram of an output unit illustrated in FIG. 6.

FIG. 7 is a function block diagram of the output unit 95. Referring to FIG. 7, the output unit 95 includes a charge control unit 96 and a plurality of battery units 97A, 97B, 97C. The charge control unit 96 receives output power from the generators 401, 610, 50, via the power controller 90, and uses the power to charge the battery units 97A-C one by one. The charge control unit 96 also connects one of the battery units 97A-C to an output terminal 99 according to an instruction from the operation controller 80, and via the output terminal 99, supplies power from the battery unit to an external load. The battery units 97A-C include, for example, nickel-metal hydride batteries or lithium ion secondary batteries.

Referring again to FIG. 7, the charge control unit 96 includes a constant current source 961, a measurer 962, a selector 963, and an instructor 964. The constant current source 961 generates an output current by using power supplied from the power controller 90, and adjusts the output current to a target value that is constant. The measurer 962 measures an actual current amount flowing from the constant current source 961 to any of the battery units 97A-C. The selector 963 selects one of the battery units 97A-C to connect to an output end of the constant current source 961. As a result, output current of the constant current source 961 is supplied to the selected battery unit as a charge current. The instructor 964 instructs a target value of an output current amount, i.e. a target value of a charging current amount, to the constant current source 961, and instructs a supply destination of the charging current, i.e. a battery unit to be charged, to the selector 963. The instructor 964, while the battery unit is being charged, monitors whether or not a measured value of the measurer 962 meets a condition for a reduction in charging current amount to be regarded as having occurred. When the measured value meets the condition, the instructor 964 instructs the selector 963 to change the destination where to supply output current of the constant current source 961, i.e. a battery unit to be charged.

The charge control unit 96 also includes a switch 965. The switch 965 is normally open, and therefore the battery units are cut off from the output terminal 99. When the switch 965 receives an instruction from the operation controller 80, the switch 965 connects one of the battery units 97A-C to the output terminal 99 according to the instruction.

The charge control unit 96 monitors a charge amount of each battery unit by integrating a measured value of the charging current amount. The operation controller 80 during the sleep mode or power outage, for example, first acquires charge amounts of the battery units from the charge control unit 96, and based on the charge amounts, selects a battery unit to be indicated in the instruction to the switch 965. Among the battery units, one having the highest charge amount may be selected, for example. The operation controller 80 then instructs the switch 965 to connect the selected battery unit to the output terminal 99. In this way, power stored in the selected battery unit is sent via the output terminal 99 to the operation unit 70, the operation controller 80, or the power controller 90, and used as standby power or auxiliary power therefor.

The operation controller 80 also integrates amounts of the current output from the output terminal 99, and thereby monitors a discharge amount of each battery unit. The charge control unit 96 obtains a value of the discharge amount of each battery unit from the operation controller 80 to correct the current charge amount of each battery unit.

Details of Charge Control

Figure 8:
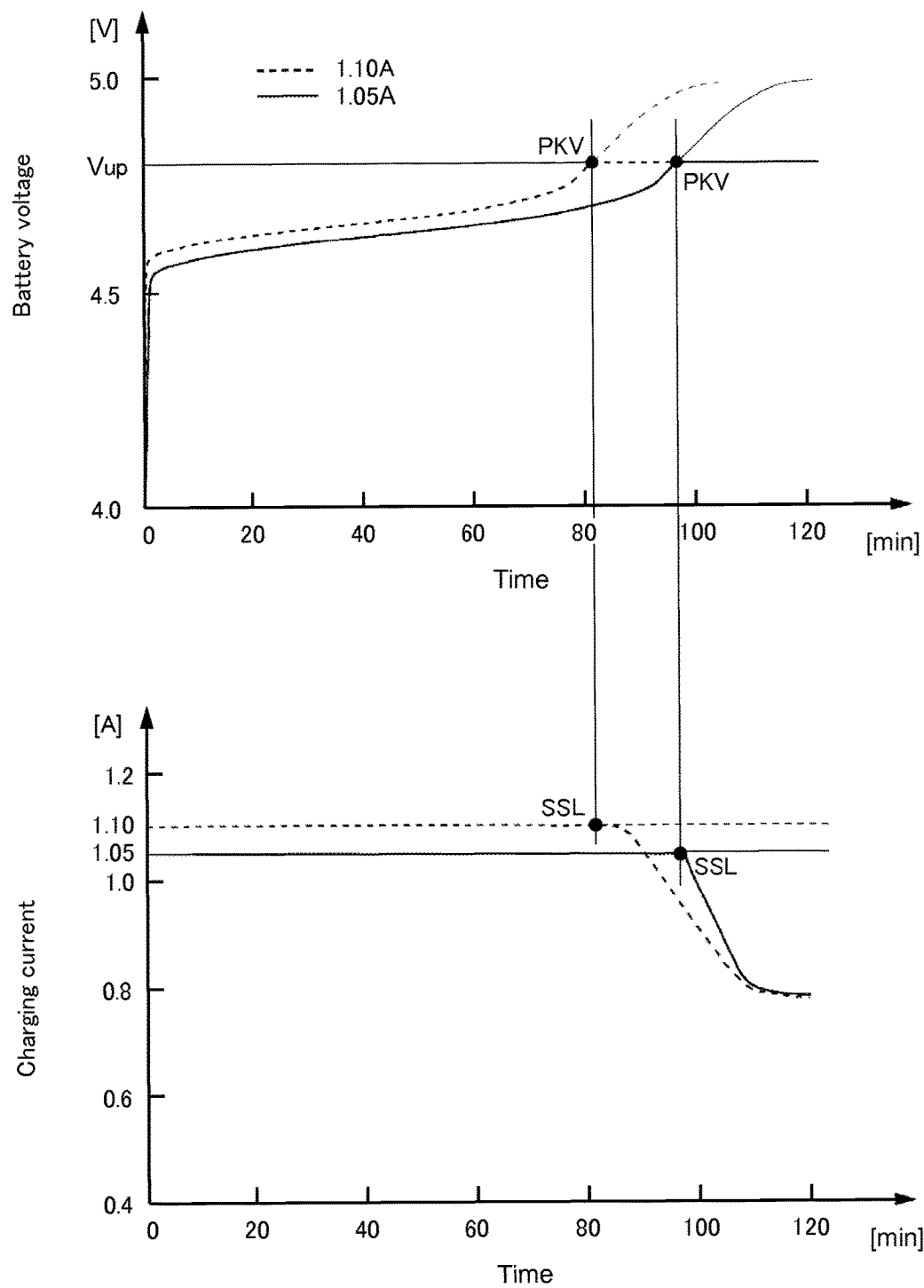
FIG. 8 includes graphs illustrating charging characteristics of the battery unit illustrated in FIG. 7.

Conditions for a Reduction in Charging Current Amount to be Regarded as Having Occurred FIG. 8 includes graphs indicating charge characteristics of a battery unit that the selector 963 connects to the constant current source 961, i.e. temporal changes of the battery voltage and the charging current amount during a period of charging the battery unit. Referring to FIG. 8, from the early through middle stage of the charging period, constant current charging is performed and thus the charging current amount is maintained at a constant target value, for example, 1.05 A or 1.10 A, which the instructor 964 has determined and instructed to the constant current source 961. The instructor 964 acquires from the operation controller 80 a value that shows an amount of power supplied from the power controller 90 to the constant current source 961. (The amount of power is hereafter referred to as "power generation amount.") The instructor 964 then determines the target value of the charging current amount based on the power generation amount and an upper boundary Vup of the battery voltage.

In the constant current charging, the battery voltage increases with the increase in the charge amount of the battery unit. The battery voltage cannot exceed the upper boundary Vup, and therefore, when the battery voltage reaches the upper boundary Vup (see the points PKV in FIG. 8) during the end stage of the charging period, the charging current amount begins to decrease (see the points SSL in FIG. 8).

The reduction in charging current amount is detected by the instructor 964 from a measured value by the measurer 962. Specifically, one of the following three conditions (1), (2), and (3) is set as the condition for reduction in charging current amount to be regarded as having occurred regardless of the adjustment operation of the constant current source 961.

(1) A difference between the measured value and the target value of the charging current amount increases to a threshold.

(2) A rate of decrease of the measured value increases to a threshold.

(3) The measured value decreases to a threshold.

Figure 9A:
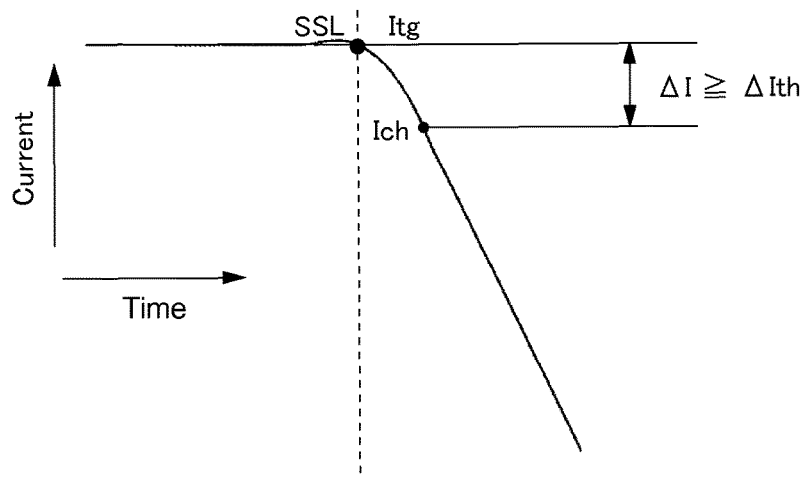
FIGS. 9A-C are schematic diagrams illustrating conditions for a reduction in charging current amount to be regarded as having occurred.

FIG. 9A is a schematic diagram indicating condition (1), i.e. the case in which the value to be monitored is the difference between the measured value and the target value of the charging current amount. Referring to FIG. 9A, in parallel with the decrease of the charging current amount from the time when the battery voltage reaches the upper boundary Vup, the measured value Ich begins decreasing from the target value Itg of the charging current amount (see the point SSL indicated in FIG. 9A). The instructor 964 monitors the difference $\Delta I=Itg-Ich$ between the measured value Ich and target value Itg, and when the difference $\Delta I$ increases to a threshold $\Delta Ith$, considers that the reduction in charging current amount has occurred. The threshold $\Delta Ith$ is, for example, set to be an acceptable upper boundary of fluctuation of the charging current amount during the constant current charging.

Figure 9B:
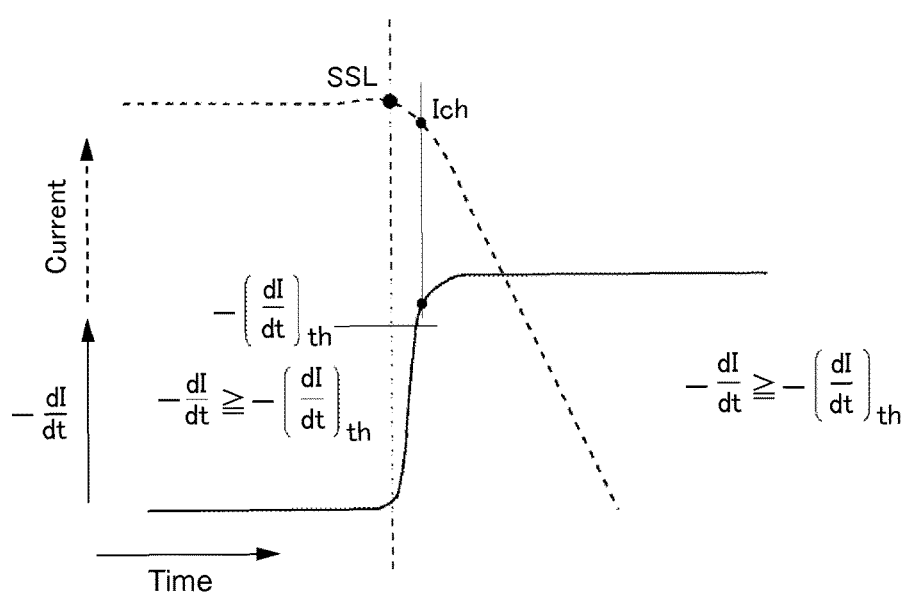

FIG. 9B is a schematic diagram indicating condition (2), i.e. the case in which the value to be monitored is a rate of decrease of a measured value of the charging current amount. Referring to FIG. 9B, near the time when the battery voltage reaches the upper boundary Vup (see the point SSL indicated in FIG. 9B), the charging current amount begins decreasing from the target value (see the broken line graph indicated in FIG. 9B). In parallel with the decrease, the time differential dI/dt of the measured value Ich of the charging current amount begins to drop from zero, i.e. the rate of the decrease −dI/dt begins increasing (see the solid line graph indicated in of FIG. 9B). The instructor 964 monitors the rate of the decrease −dI/dt of the measured value Ich, and when the measured value increases to a threshold −(dI/dt)th, considers that the reduction in charging current amount has occurred. The threshold −(dI/dt)th is, for example, set to be an acceptable upper boundary of the fluctuation rate (time differential of the fluctuation) of the charging current amount during the constant current charging.

Figure 9C:
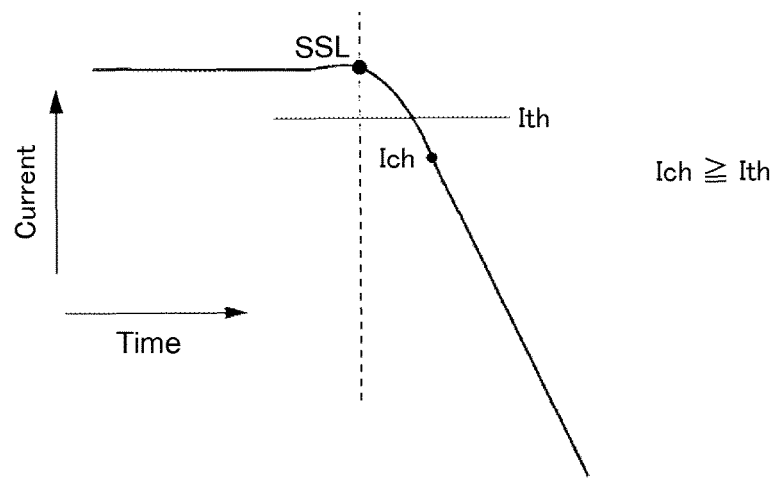

FIG. 9C is a schematic diagram indicating condition (3), i.e. the case in which the value to be monitored is the measured value of the charging current amount. Referring to of FIG. 9C, in parallel with the decrease of the charging current amount from the time when the battery voltage reaches the upper boundary Vup, the measured value Ich begins decreasing from the target value of the charging current amount (see the point SSL indicated in of FIG. 9C). The instructor 964 monitors the measured value Ich, and when the measured value Ich decreases to a threshold Ith, considers that the reduction in charging current amount has occurred. The threshold Ith is, for example, set to be the value of an acceptable upper boundary $\Delta Ith$ of fluctuation subtracted from the target value Itg of the charging current amount during the constant current charging (Ith=Itg−$\Delta Ith$).

Reduction of Charging Loss by Switching Battery Units

One of the three conditions, (1), (2), and (3) described above is set in the instructor 964 as the condition for a reduction in charging current amount to be regarded as having occurred. When the measured value by the measurer 962 meets the set one of the conditions, the instructor 964 considers that the reduction in charging current amount has occurred, and then instructs the selector 963 to change which battery unit is to be charged. In this way, the instructor 964 does not allow the battery unit prior to the change to reach the full charge.

This charge control reduces charging loss lower than that of a control for charging the battery unit until it reaches the full charge. For example, let us assume the following charge control as a specific comparative example. "A battery unit having the charging characteristics illustrated in FIG. 8 undergoes the constant voltage charging continuously during a period starting from the point SSL at which the charging current amount begins decreasing until the battery unit reaches the full charge; during this period, a 361 mAh current is accordingly outputted from the constant current source 961." From the charging characteristics illustrated in FIG. 8, the value of 291 mAh is found by integration of the charging current amount during the period, i.e. the value is estimated as the quantity of electric charges that have been stored in the battery unit during the period. Accordingly, a charging loss of (391−291)/391=19% is estimated. In contrast, the charging control of the above-described embodiment, at the point SSL when the charging current amount begins to decrease, changes the battery unit to be charged and performs constant current charging for the battery unit to be charged after the change. Accordingly, there occurs no charging loss caused by the decrease of charging current amount during the constant voltage charging. In this way, the charge control according to the present embodiment achieves a 19% reduction in charging loss compared to the above-described comparative example.

Selection of Battery Unit to be Charged

The instructor 964 is notified by the operation controller 80 of power generation amounts of the generators. The instructor 964, based on the power generation amounts notified, selects a battery unit to be charged, which the instructor 964 should instruct to the selector 963 as a destination where to supply output current of the constant current source 961.

The battery to be charged is selected as follows. The instructor 964 first, based on the power generation amounts of the generators notified by the operation controller 80, judges whether or not to change the target value of the charging current amount. When the instructor 964 decides to change the target value because of a change in a power generation amount, the instructor 964 retrieves a boundary charge amount of each battery unit with respect to a target value after said change.

Figures 10A, 10B, 10C:
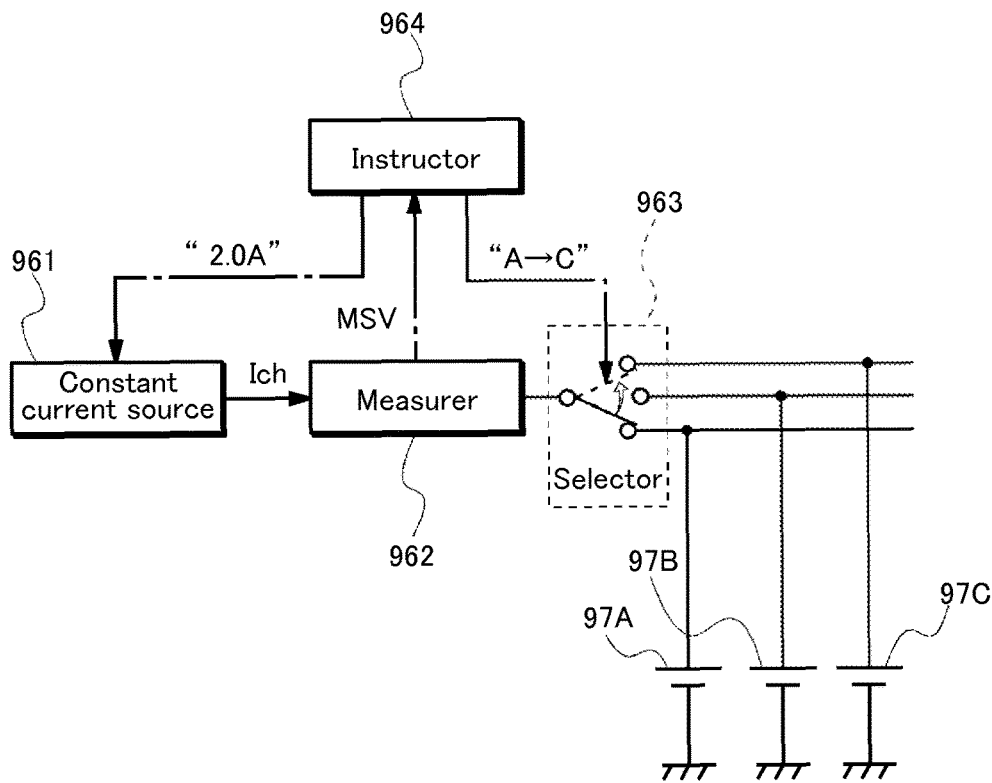
FIG. 10A is a table illustrating correspondence between a target value of charging current amount and a boundary charge amount for each of the battery units illustrated in FIG. 7.
FIG. 10B is a table illustrating a charge amount of each battery unit at a given time.
FIG. 10C is a schematic diagram illustrating a selection operation of battery units according to a charge control unit.

FIG. 10A is a table illustrating correspondence between target values and boundary charge amounts of a charging current amount for each of the battery units illustrated in FIG. 7. Data corresponding to the table is stored in advance in the instructor 964. The "boundary charge amount" means a value that shows the charge amount of a battery unit when a decrease in charging current amount occurs due to the battery voltage reaching an upper boundary during constant current charging; the value is, for example, expressed as a percentage of the full charge amount. Referring to FIG. 10A, boundary charge amounts typically vary according to battery unit type and target value of charging current amount; in particular, a lower boundary charge amount corresponds to a higher target value.

On the other hand, the instructor 964 monitors the current charge amounts of the battery units by continuing to integrate measured values by the measurer 962. The instructor 964 compares the charge amounts of the battery units to the retrieved boundary charge amounts thereof, and extracts from the battery units a battery unit whose current charge amount is lower than its boundary charge amount.

FIG. 10B is a table illustrating charge amounts of the battery units indicated in FIG. 7 at a given time. Data corresponding to the table is stored in the instructor 964. Referring to FIG. 10B, the charge amounts are expressed as percentages of the full charge amounts. The instructor 964 continuously integrates measured values from the measurer 962, and periodically uses the integrated values to update the table of FIG. 10B.

The instructor 964 further selects as a battery unit to be charged any of the battery units whose current charge amounts are lower than their respective boundary charge amounts, and instructs the selector 963 to supply the selected battery unit with output current of the constant current source 961.

FIG. 10C is a schematic diagram illustrating operation of the charge control unit 96 illustrated in FIG. 7 when selecting a battery unit. Referring to FIG. 10C, the instructor 964, when deciding to change the target value of the charging current amount to "2.0 A", first retrieves the boundary charge amount of each battery unit corresponding to the target value "2.0 A". According to the table in FIG. 10A, the boundary charge amounts of the battery units A, B, and C are "75%", "80%", and "75%", respectively. On the other hand, according to the table of FIG. 10B, the current charge amounts of the battery units A, B, and C are "60%", "80%", and "60%", respectively. Accordingly, the instructor 964 extracts the battery units A and C, whose current charge amounts are lower than their respective boundary charge amounts. The instructor 964 then selects from the extracted battery units A and C, the battery unit A to be charged and instructs the selector 963 to supply the battery unit A with output current of the constant current source 961. The position of the selector 963 at this time is indicated by a solid line in FIG. 10C.

The instructor 964 subsequently indicates the target value "2.0 A" of the charging current amount to the constant current source 961. This triggers constant current charging for the battery unit A. While charging, the instructor 964 monitors the measured values MSV by the measurer 962 and periodically uses integrated values of the measured values MSV to update the value that the instructor 964 holds as the charge amount of the battery unit A.

When the measured values MSV meets one of the above-described conditions (1)-(3) that has been set as the condition for a reduction in charging current amount to be regarded as having occurred, the instructor 964 retrieves a boundary charge amount of each battery unit corresponding to the target value "2.0 A" of the charging current amount and compares the boundary charge amount to the current charge amount of the battery unit. Since in the battery unit A, the reduction in charging amount is regarded as having occurred, the charge amount of the battery unit A should not be less than the boundary charge amount in contrast to the value indicated in FIG. 10B. Accordingly, the instructor 964 next selects the battery unit C to be charged since the battery unit C has a current charge amount lower than the boundary charge amount, and instructs the selector 963 to change the destination where to supply output current of the constant current source 961. The position of the selector 963 at this time is indicated by a dashed line in FIG. 10C.

Note that when none of the battery units has a charge amount less than its boundary charge amount, the instructor 964 stops the constant current source 961 and prevents charging of any of the battery units.

Flow of Charge Control Processing

Figure 11:
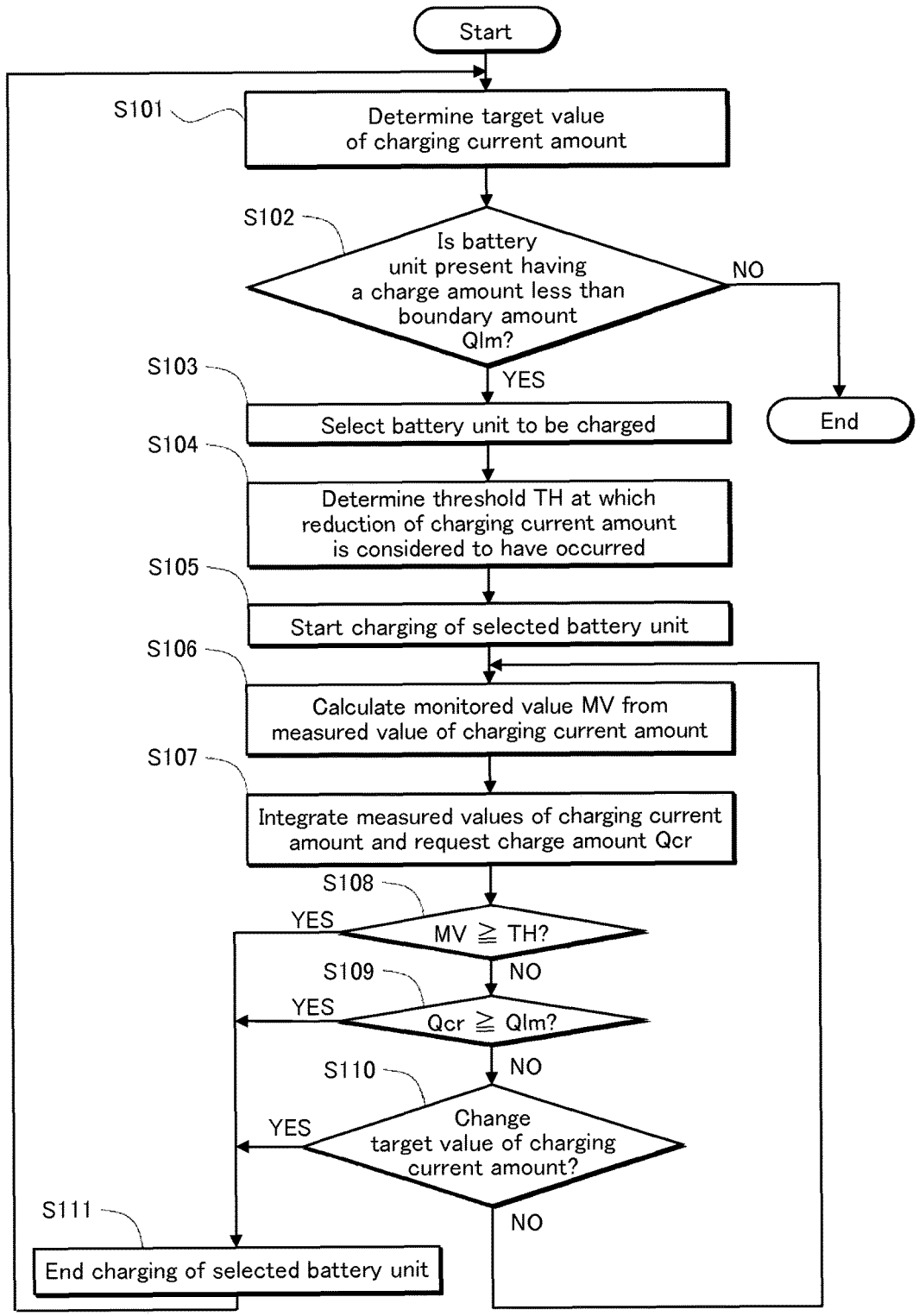
FIG. 11 is a flowchart of charge control according to an embodiment of the present invention.

FIG. 11 is a flowchart of charge control of the charge control unit 96. This charge control is triggered by a notification to the charge control unit 96 of amounts and changes of power generations of the generators; the notification is sent from the operation controller 80 in response to another notification from the power controller 90.

In step S101, the instructor 964 determines the target value of a charging current amount based on the power generation amounts notified and the upper boundary of a battery voltage. Subsequently, processing proceeds to step S102.

In step S102, the instructor 964 retrieves a boundary charge amount Qlm of each battery unit corresponding to the target value of the charging current amount and compares the boundary charge amount Qlm to the current charge amount of the battery unit. If there is a battery unit having the current charge amount lower than the boundary charge amount, processing proceeds to step S103, and if not, processing ends.

In step S103, the battery units include one or more battery units having the current charge amounts lower than the boundary charge amounts. Among the one or more battery units, the instructor 964 arbitrarily selects the battery unit to be charged, and instructs the selector 963 to supply the selected battery unit with output current of the constant current source 961. Subsequently, processing proceeds to step S104.

In step S104, the instructor 964 determines a threshold TH for a monitored value MV to be included in the condition for a reduction in charging current amount to be regarded as having occurred from measured values by the measurer 962. Specifically, the instructor 964 determines: regarding the condition (1) indicated in FIG. 9A, the threshold $\Delta$Ith for the difference between the target value Itg of the charging current amount and the measured value Ich ($\Delta$I=Itg−Ich); regarding the condition (2) indicated in FIG. 9B, the threshold −(dI/dt)th for the rate of decrease −dI/dt of the measured value Ich; and regarding the condition (3) indicated in FIG. 9C, the threshold Ith for the measured value Ich itself. Subsequently, processing proceeds to step S105.

In step S105, the instructor 964 indicates the target value of the charging current amount to the constant current source 961. In response to that, constant current charging begins for the battery unit selected in step S103. Subsequently, processing proceeds to step S106.

In step S106, the constant current charging started in step S105 continues. The instructor 964 acquires a measured value from the measurer 962 and uses it to calculate a monitored value MV. Specifically, the instructor 964 calculates: regarding condition (1), the difference between the target value Itg of the charging current amount and the measured value Ich, $\Delta$I=Itg−Ich, and regarding condition (2), the rate of decrease −dI/dt of the measured value Ich. Regarding condition (3), the instructor 964 uses the measured value Ich itself as the monitored value MV. Subsequently, processing proceeds to step S107.

In step S107, the instructor 964 integrates the measured values acquired from the measurer 962 to obtain a charge amount Qcr of the battery unit being charged each time step S106 is repeated after step S105. Subsequently, processing proceeds to step S108.

In step S108, the instructor 964 checks whether or not the monitored value MV calculated in step S106 is no less than the threshold TH determined in step S104. If the monitored value MV is no less than the threshold TH, processing proceeds to step S111, and if not, processing proceeds to step S109.

In step S109, the monitored value MV is less than the threshold TH. However, this result is not guaranteed to be correct depending on an error in the monitored value MV. The instructor 964, with an aim of ensuring reliability of the result, compares the charge amount Qcr of the battery unit being charged to the boundary charge amount Qlm thereof; the charge amount Qcr has been obtained in step S107, and the boundary charge amount Qlm has been retrieved in step S102. If the charge amount Qcr is no less than the boundary charge amount Qlm, processing proceeds to step S111, and if not, processing proceeds to step S110.

In step S110, the monitored value MV is less than the threshold TH, and the charge amount Qcr of the battery unit being charged is less than the boundary charge amount Qlm. In this case, the instructor 964 first checks whether or not it has received a new notification of power generation amounts of the generators from the operation controller 80. If it has received no new notification, any change of the target value of the charging current amount is clearly unnecessary, and therefore processing repeats from step S106. If having received a new notification, the instructor 964 further, based on the notification, judges whether or not to change the target value of the charging current amount. If it decides to change the target value, processing proceeds to step S111, and if not, processing repeats from step S106.

In step S111, one of the following conditions is met: (i) The monitored value MV is no less than the threshold TH; (ii) the charge amount Qcr of the battery unit being charged is no less than the boundary charge amount Qlm; and (iii) the target value of the charging current amount is to be changed. In this case, the instructor 964 instructs the constant current source 961 to stop power output. In this way, the constant current charging of the battery unit being charged is ended. Subsequently, processing returns to step S101.

Advantages of the Embodiment of the Present Invention

The charge control unit 96 according to the above-described embodiment of the present invention first selects from a plurality of the battery units a battery unit to be charged based on a target value of the charging current amount; the selected battery unit has a charge amount less than a corresponding boundary charge amount. The charge control unit 96 then performs constant current charging for the battery unit to be charged, and in parallel, monitors the actual charging current amount flowing to the battery unit. The charge control unit 96 further, when the measured value of the charging current amount meets the condition for a reduction in charging current amount to be regarded as having occurred, changes the battery unit being charged to a different battery unit.

In this way, the charge control unit 96 does not allow the charge amount of any battery unit to exceed a corresponding boundary charge amount, thus enabling a reduction in charging loss caused by a reduction in charging current amount. This results in an increase in the ratio of the power amount stored in the battery units to the power generation amounts of the generators, and therefore, in an increase in substantial power generation efficiency thereof.

Modifications (A) The image forming apparatus 100 is the color laser printer. The image forming apparatus may also be a monochrome laser printer, a fax machine, a copier, a multi-function peripheral, etc.

(B) In the fixer 30, the heater 31A built in the fixing roller 31 is a halogen lamp. The heater 31A may also be an induction heating device. The fixer 30, instead of the fixing roller 31, may include a combination of a fixing belt configured to contact sheets and a device for heating the fixing belt.

(C) Locations of the generators are not limited to the locations illustrated in FIG. 1. A thermoelectric generator unit may also be located, aside from the vicinity of the fixer 30 and the upper surface of the discharge tray 38 where the generators 401 and 402 are located, near any element of the image forming apparatus 100 that emits a large amount of heat, such as a power supply device, a drive motor of each type of roller and belt, the CPU built in the operation controller 80, etc. A photovoltaic generator unit may also be located, aside from the upper surface of the ADF where the generator 50 illustrated in FIG. 1 is located, at any place easily exposed to natural or artificial light, such as a front face, side face, rear face, operation panel, etc., of the body of the image forming apparatus 100. A vibration-powered generator unit may also be located, aside from the vicinities of the rollers and belts in the feeder 10 where the generators 610, 620 illustrated in FIG. 1 are located, in any portion of the image forming apparatus 100 subject to vibrations, such as the ADF, the vicinities of rollers and belts in the imager, doors provided in the body of the image forming apparatus 100, the storage tray 11, a finisher, etc.

(D) Characteristics of the generators illustrated in FIGS. 2A-4C are only examples, and generators having other characteristics may be used. Specifically, the structure of the thermoelectric transducer used in the thermoelectric generator unit is not limited to the structure illustrated in FIG. 2A; any of size and shape of the substrates 42 and 43, and the number, shape, size, arrangement, and type of the semiconductor elements 44P and 44N may be different from those of the structure illustrated in FIG. 2A. Further, the thermoelectric generator unit may have, aside from the series connection of all the thermoelectric transducers, a single thermoelectric transducer or the parallel connection of portions divided from the series connection of the thermoelectric transducers. The thermoelectric generator units may, instead of the thermoelectric transducers, use a miniature Stirling engine. A vibration-powered generator unit may, aside from the electrostatic induction types 610, 620 illustrated in 4A, be a piezoelectric or electromagnetic induction type. Further, the generator units may, aside from the generators using thermoelectric conversion, photovoltaic conversion, and vibration-electricity conversion illustrated in FIGS. 2A-4C, be a type using radio power generation or wind power generation.

(E) The operation controller 80, the power controller 90, and the output unit 95 are implemented on a single substrate. Alternatively, any of those functional units may be separated on a different substrate. Further, the functional units may be integrated in a single chip.

(F) The output unit 95 supplies power stored in the battery units to the operation unit 70, the operation controller 80, and the power controller 90 as standby power or auxiliary power during power outages. The output unit 95 may also allow the power to be used for pre-heating or maintaining heat of the fixing roller 31 in the waiting mode or for driving an exhaust fan.

(G) The instructor 964, when using the condition (2) illustrated in FIG. 9B, immediately considers the moment of an increase in the rate of decrease −dI/dt of the measured value Ich of the charging current amount to the threshold −(dI/dt)th as a reduction in the charging current amount. The instructor 964 may also consider the duration of a predefined time or more for which the rate of decrease of the measured value continues to exceed the threshold as a reduction in the charging current amount. The instructor 964 thus reduces risk of mistaking temporary fluctuation of the measured value caused by a superimposed surge, etc., for a reduction of the charging current amount.

(H) One of the three conditions, (1), (2), and (3) described above is set in the instructor 964 as the condition for a reduction in charging current amount to be regarded as having occurred. An increase of charge amount of a battery unit being charge to a corresponding boundary charge amount may also be added as one option for the condition. When the new option is set as the condition, step S108 may be omitted from the flowchart illustrated in FIG. 11.

In the flowchart illustrated in FIG. 11, step S109 is executed in addition to step S108, thereby ensuring reliability of judgment. Alternatively, when reliability of the judgment in step S108 is sufficiently high, step S109 may be omitted.

(I) When none of the battery units has a charge amount less than a corresponding boundary charge amount, the charge control unit 96 does not perform charging of any of the battery units. The charge control unit may alternatively, when none of the battery units has a charge amount less than a corresponding boundary charge amount, use a constant voltage source to perform constant voltage charging of one of the battery units. Although losing a portion of power generated by the generators because of charging loss, the charge control unit can store remaining power in the battery units.

(J) The operation controller 80 monitors power generation amounts of the generators via the power controller 90, and sends a notification indicating the values and changes of the power generation amounts to the instructor 964 of the charge control unit 96. The instructor 964, based on the notification, judges whether or not to change the target value of the charging current amount.

Alternatively, the operation controller 80 may use a measuring instrument such as the temperature sensor 34 to monitor environmental conditions affecting power generation amounts of the generators such as temperature of the fixer 30, and to send a notification indicating the values and changes of the environmental conditions to the instructor 964. In this case, the instructor 964 may predict, from the changes in the environmental conditions, changes in power generation amounts of the generators, and based on the power generation amounts after the predicted changes, may judge whether or not to change the target value of the charging current amount. Further, when deciding to change the target value, the instructor 964 first predicts the charge amount of each battery unit at the predicted changes in the power generation amounts. The instructor 964 then deduces as a candidate for a new battery unit to be charged, a battery unit having its predicted charge amount smaller than a boundary charge amount corresponding to the target value after the change. By this deduction, the charge control unit 96 can change a battery unit to be charged quickly in response to a reduction in charging current amount.

(K) Planning Changes of Battery Units to be Charged Based on Schedule of Switches of Operating Mode The image forming apparatus 100 switches operation modes between the three types RNG, WTG, and SLP, as illustrated in FIG. 6, according to a schedule of jobs that it has accepted. Changes of the operation modes change the degrees of activity of the feeder 10, the imager 20, the fixer 30, etc., and therefore change the environmental conditions of the generators such as the amount of vibration of the feeder 10, the temperature of the fixer 30. This results in changes in the amount of power generation amounts of the generators.

The instructor 964 may acquire a schedule of changes of the operation modes from the operation controller 80 to predict changes in power generation amounts caused by changes in the environmental conditions of the generators. During the processing period of one job, the operation modes will typically be switched multiple times in succession. When predicting that the successive switches of the operation modes cause successive multiple changes in the power generation amounts of the generators, the instructor 964 may deduce a battery unit to be charged so that the following condition will be met at each of the predicted changes in the power generation amounts. The condition is that a predicted charge amount of the battery unit to be charged at each of the predicted changes be less than the boundary charge amount corresponding to the target value of the charging current amount to be used from each of the predicted changes until the next one.

The instructor 964 may perform such deduction for each job to plan changes of the battery unit to be charged before actual execution of the job, thereby changing the battery unit to be charged quickly at each switch of the operation modes. Further, the instructor 964 enables any of the battery units to continue to be charged as long as possible without allowing the charge amount thereof to exceed the boundary charge amount. As a result, the instructor 964 can substantially improve power generation efficiency of the generators.

Relationships Between Operation Modes and Power-Generation Potential of Generators FIG. 12A is a table showing relationships between the operations modes and power-generation potential of the generators of the image forming apparatus 100. Referring to FIG. 12A, circles indicate generators that can produce power, and crosses indicate generators that cannot produce power. Data corresponding to the table is stored in advance in the instructor 964.

According to the table in FIG. 12A, among the first thermoelectric generator unit 401, the second thermoelectric generator unit 402, the photovoltaic generator unit 50, and the vibration-powered generator units 610, 620: in the sleep mode only the photovoltaic generator unit 50 can produce power; at the start of the running mode, for example at the start of printing, all of the generators aside from the second thermoelectric generator unit 402 can produce power; during the middle to end stage of the running mode, for example during printing, all of the generators can produce power; and in the waiting mode, the first thermoelectric generator unit 401 and the photovoltaic generator unit 50 can produce power. Actually, in the sleep mode, the feeder 10, the imager 20, and the fixer 30 are all stopped, and therefore the first thermoelectric generator unit 401, the second thermoelectric generator unit 402, and the vibration-powered generator units 610, 620 cannot generate electricity. In the running mode, the feeder 10, the imager 20, and the fixer 30 are all running, and therefore the first thermoelectric generator unit 401 and the vibration-powered generator units 610, 620 can generate electricity. The second thermoelectric generator unit 402 can generate electricity from the middle stage of a printing period because an amount of heat transferred from sheets stacked on the discharge tray reaches a certain level. In the waiting mode, the feeder 10 and the imager 20 are stopped, and the fixer 30 is preheating the fixing roller 31 to maintain it at a proper temperature, and therefore the first thermoelectric generator unit 401 can generate electricity but the second thermoelectric generator unit 401 and the vibration-powered generator units 610, 620 cannot generate electricity. The photovoltaic generator unit 50 can generate electricity in any mode, unlike the other generators.

Predicting Power Generation Amount of Generators and Charging Current Amount Based on Schedule of Switches of Operation Modes Each time the operation controller 80 accepts a job, the instructor 964 acquires a schedule of switches of operation modes in the job from the operation controller 80. The schedule specifies an order of the operation modes to be set during processing of the job.

After that, the instructor 964 first refers to the table in FIG. 12A and predicts power generation amounts of the generators in each operation mode included in the schedule. The instructor 964 subsequently predicts a target value of the charging current amount to be set for each predicted power generation amount.

FIG. 12B is a table indicating power generation amounts and target values of charging current amounts that are predicted for each scheduled operation mode in a given job. Referring to FIG. 12B, the job is a printing process, and during the process, the following operation modes are schedules in this order: the sleep mode, the running mode, the waiting mode, and the sleep mode.

In this case, the instructor 964 divides the power generation amounts of the generators into three broad levels: "large", "medium", and "small", and predicts transitions between the three levels as follows. Predicted values of the power generation amounts of the generators are "small" in the first sleep mode, "medium" at the start of the running mode, i.e. the start of printing, "large" from the middle to end stage of the running mode, i.e. during printing, "medium" in the waiting mode, and "small" in the final sleep mode.

From the predicted values, the instructor 964 further predicts a target value of a charging current amount to be set for each operation mode as follows. When any of three values "1.0 A", "2.0 A", and "3.0 A" can be set as the charging current amount, the instructor 964 allocates the values to the three levels "small", "medium", and "large" of the power generation amounts, starting from the smallest. As a result, a predicted target value of the charging current amount is "1.0 A" in the first sleep mode, "2.0 A" at the start of the running mode, i.e. at the start of the printing, "3.0 A" from the middle to end stage of the running mode, i.e. during the printing, "2.0 A" in the waiting mode, and "1.0 A" in the last sleep mode. Selecting battery units to be charged based on predicted charge amounts Based on the target value of the charging current amount predicted for each operation mode specified by the schedule, the instructor 964 deduces a battery unit to be selected as one to be charged during the operation mode as follows. The instructor 964 first retrieves, for each operation mode, the boundary charge amounts of the battery units corresponding to the predicted target values of the charging current amount from the table (see FIG. 10A) indicating the relationships between the target values of the charging current amount and boundary charge amounts. The instructor 964 then, by using a current charge amount of each battery unit as initial values, repeats the selection of a battery unit to be charged and the prediction of a change in the charge amount of the selected battery unit in the order of the operation modes specified by the schedule. The selections conform to the condition that the predicted charge amount of a battery unit to be charged in any operation mode is less than the boundary charge amount corresponding to the target value of the charging current amount of the battery units in the operation mode. Until the condition is met for all the operation modes specified by the schedule, the instructor 964 repeats the prediction of changes in charge amounts of the battery units while changing patterns of selecting battery units to be charged.

FIG. 12C is a table illustrating correspondence between the patterns of selecting from the battery units A-C illustrated in FIG. 7, one to be charged in each operation mode illustrated in FIG. 12B, and predicted charge amounts; Referring to FIG. 12C, the battery units to be charged are selected according to two types of patterns, pattern I and pattern II, and changes in charge amount of the battery units in each pattern are predicted as follows.

In any of the patterns, the battery units A, B, and C in the initial sleep mode have the charge amounts of initial values "80%", "70%", and "60%", respectively. According to FIG. 12B, the target value of the charging current amount is "1.0 A" in the initial sleep mode. According to FIG. 10A, the boundary charge amount of any battery unit is "90%", and therefore the above-defined condition is met in the initial sleep mode even if any of the battery units is selected to be charged. Accordingly, the instructor 964 selects the battery unit A to be charged.

Based on the schedule, the instructor 964 estimates the time that will elapse until switching from the initial sleep mode to the running mode, and uses the time and the target value of the charging current amount in the initial sleep mode to predict a charge amount of the battery unit A at the switching to the running mode. According to FIG. 12C, the predicted value is "82%", for example.

According to FIG. 12B, at the start of the running mode, i.e. at the start of printing, the target value of the charging current amount is "2.0 A". According to the table of FIG. 10A, the boundary charge amounts are "75%", "80%", and "75%" for the battery units A, B, and C, respectively. Accordingly, the above-defined condition is met if any of the battery units B, C is selected to be charged. The pattern in which the battery unit B is selected to be charged is called "I", and the pattern in which the battery unit C is selected is called "II".

Pattern I

The instructor 964 estimates the time from the start to middle stage of the running mode, i.e. the time that will elapse until the second thermoelectric generator unit 402 can generate power due to heat transferred from sheets stacked on the discharge tray; the instructor 964 then uses the time and the target value of the charging current amount in the start of the running mode to predict a charge amount of the battery unit B at the middle stage of the running mode. According to FIG. 12C, the predicted value is "76%", for example.

According to FIG. 12B, during and after the middle stage of the running mode, i.e. during printing, the target value of the charging current amount is "3.0 A". According to FIG. 10A, the boundary charge amounts are "65%", "70%", "65%" for the battery units A, B, C, respectively, and therefore only the battery unit C can be selected to be charged in order to meet the above-defined condition.

The instructor 964 estimates the time that will elapse until the end of the running mode, i.e., until printing is finished, and uses the time and the target value of the charging current amount from the middle to end stage of the running mode to predict a charge amount of the battery unit C at the end of the running mode. According to FIG. 12C, the predicted value is "70%", for example.

According to FIG. 12B, in the waiting mode, i.e. while the fixer 30, after the end of printing, continues to preheat the fixing roller 31, the target value of the charging current amount is "2.0 A". According to the table of FIG. 10A, the boundary charge amounts are "75%", "80%", and "75%" for the battery units A, B, and C, respectively, and therefore, as long as the battery unit C continues to be selected, the above-defined condition is met.

The instructor 964 estimates the time of the waiting mode, and uses the time and the target value of the charging current amount in the waiting mode to predict a charge amount of the battery unit C at the end of the waiting mode. According to FIG. 12C, the predicted value is "72%", for example.

According to FIG. 12B, in the final sleep mode the target value of the charging current amount is "1.0 A". According to FIG. 10A, the boundary charge amount of any battery unit is "90%", and therefore, even if any of the battery units is selected to be charged, the above-defined condition is met.

In pattern I, charging of the battery units thus continues throughout all the operation modes specified by the schedule without allowing the charge amount of any battery unit to exceed the corresponding boundary charge amount.

Pattern II

The instructor 964 estimates the time that will elapse from the start to middle stage of the running mode and uses the time and the target value of the charging current amount in the start of the running mode to predict a charge amount of the battery unit C. According to FIG. 12C, the predicted value is "66%", for example.

According to FIG. 12B, during and after the middle stage of the running mode, the target value of the charging current amount is "3.0 A". According to the table of FIG. 10A, the boundary charge amounts are "65%", "70%", and "65%" for the battery units A, B, and C, respectively, and therefore, even if any of the battery units is selected to be charged, the above-defined condition would not be met.

In pattern II, every charge amount of the battery units would reach or exceed a corresponding one of the boundary charge amounts during the running mode; this precludes continuous charging of the battery units throughout processing of the job.

Based on the above-described estimation, the instructor 964 determines pattern I, not pattern II, as the plan of changes of battery units to be charged. The instructor 964 then, during processing of the scheduled job, changes a battery unit to be charged according to the plan, each time detecting a reduction in charging current amount. In this way, charging of the battery units continues as long as possible without allowing any charge amount thereof to exceed a corresponding boundary charge amount.

Flow of Planning Changes of Battery Units to be Charged

Figure 13:
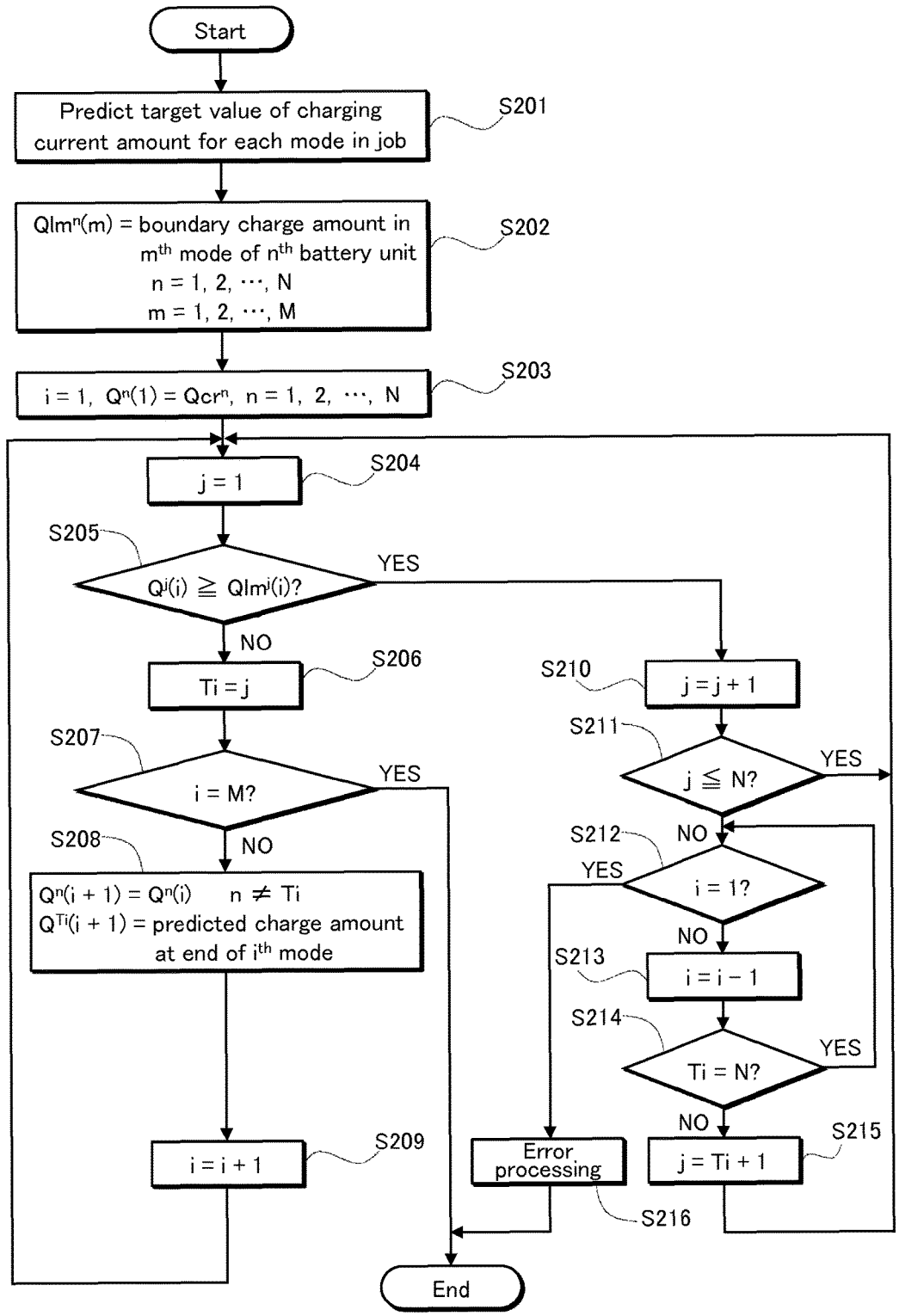
FIG. 13 is a flowchart of processing of planned switching of a battery unit to be charged to match a scheduled operation mode in a job, according to an embodiment of the present invention.

FIG. 13 is a flowchart of planning changes of battery units to be charged according to the schedule of switches of operation modes during processing of a given job. This planning process is triggered by the schedule of switching of operation modes in the job that the instructor 964 has acquired from the operation controller 80.

In step S201, the instructor 964 first references the table in FIG. 12A and predicts power generation amounts of the generators in each operation mode included in the schedule. The instructor 964 subsequently predicts a target value of the charging current amount to be set for each predicted power generation amount. Subsequently, processing proceeds to step S202.

In step S202, the instructor 964 retrieves from the table in FIG. 10A, a boundary charge amount $Qlm^n(m)$ of the $n^{th}$ battery unit, which corresponds to a predicted target value of the charging current amount for the $m^{th}$ operation mode specified by the schedule. Here, the letter "m" indicates an integer not less than one and not greater than M, and the letter "n" indicates an integer not less than one and not greater than N. The letter "M" indicates the total number of the operation modes included in the schedule and the letter "N" indicates the total number of the battery units. Subsequently, processing proceeds to step S203.

Note that, for convenience in description of this flowchart, the start and middle stage of the running mode indicated in FIGS. 12A-12C are separated as different operation modes. When there is an expectation of changes in power generation amount of the generators during a single operation mode, the duration in the single operation mode may be divided by the times of the changes into its portions; a person having ordinary skill in the art can thus apply the following described processing to each of the portions.

In step S203, the instructor 964 first initializes an integer variable i to "1". The integer variable i indicates the identification number of an operation mode in the following steps. The instructor 964 then assigns a charge amount $Qcr^n$ to a variable $Q^n(1)$, where the variable $Q^n(1)$ indicates a predicted charge amount of the $n^{th}$ battery unit in the first operation mode, and the charge amount $Qcr^n$ indicates a current charge amount of the $n^{th}$ battery unit. Subsequently, processing proceeds to step S204.

In step S204, the instructor 964 initializes another integer variable j to "1". The integer variable j indicates the identification number of a battery unit in the following steps. Subsequently, processing proceeds to step S205.

In step S205, the instructor 964 compares a predicted charge amount $Q^j(i)$ of the $j^{th}$ battery unit in the $i^{th}$ operation mode to the boundary charge amount $Qlm^j(i)$ thereof. If the predicted charge amount $Q^j(i)$ is no less than the boundary charge amount $Qlm^j(i)$, processing proceeds to step S210, and if not, processing proceeds to step S206.

In step S206, the predicted charge amount $Q^j(i)$ of the $j^{th}$ battery unit is less than the boundary charge amount $Qlm^j(i)$. Accordingly, the instructor 964 selects the $j^{th}$ battery unit to be charged, and assigns the value of the integer variable j to another variable Ti indicating the identification number of the battery unit to be charged in the $i^{th}$ operation mode. Subsequently, processing proceeds to step S207.

In step S207, the instructor 964 checks whether or not the value of the integer variable i has reached its upper boundary, i.e. the total number M of the operation modes. If the value of the integer variable i has reached the upper boundary M, processing ends, and if not, processing proceeds to step S208.

In step S208, the instructor 964 first sets a predicted charge amount $Q^n(i)$ of the $n^{th}$ battery unit in the $i^{th}$ operation mode, without changing it, as a predicted charge amount $Q^n(i+1)$ in the next operation mode; the $n^{th}$ battery unit (n≠Ti) is any of the battery units other than the battery unit to be charged, i.e., the $Ti^{th}$ battery unit. The instructor 964 then predicts a charge amount of the battery unit to be charged (the $Ti^{th}$ battery unit) that will have at the end of the $i^{th}$ operation mode, and sets the predicted value as a predicted charge amount $Q^{Ti}(i+1)$ in the next operation mode. Subsequently, processing proceeds to step S209.

In step S209, the instructor 964 increments the integer variable i by one. Subsequently, processing returns to step S204.

In step S210, the predicted charge amount $Q^j(i)$ of the $j^{th}$ battery unit is no less than the boundary charge amount $Qlm^j(i)$. Accordingly, the instructor 964 increments the integer variable j by one. Subsequently, processing proceeds to step S211.

In step S211, the instructor 964 checks whether or not the integer variable j is no greater than its upper boundary, i.e. the total number N of the battery units. If the integer variable j is no greater than the upper boundary N, processing returns to step S204, and if not, processing proceeds to step S212.

In step S212, the instructor 964 checks whether or not the integer variable i is equal to its lower boundary "1". If the integer variable i is equal to the lower boundary "1", processing proceeds to step S216, and if not, processing proceeds to step S213.

In step S213, the integer variable i is "2" or more. The instructor 964 decrements the integer variable i by one. Subsequently, processing proceeds to step S214.

In step S214, the instructor 964 checks whether or not the identification number Ti of the battery unit to be charged in the $i^{th}$ operation is equal to its upper boundary, i.e. the total number N of the battery units. If the identification number Ti is equal to the upper boundary N, processing returns to step S212, and if not, processing proceeds to step S215.

In step S215, the identification number Ti of the battery unit to be charged in the $i^{th}$ operation mode is smaller than the upper boundary N. The instructor 964 assigns a value of the identification number Ti plus one to the integer variable j. Subsequently, processing returns to step S204.

In step S216, by whatever kind of pattern battery units to be charged are selected, a charge amount of each battery unit reaches or exceeds a corresponding boundary charge amount during an operation mode specified by the schedule. In other words, charging of the battery units cannot continue throughout the job. Accordingly, the instructor 964 notifies a user of a charging control error by using a screen display, etc. Subsequently, processing ends.

The instructor 964 confirms in step S207 that, as a result of the above-described processing, all the possible values of the integer variable i, i.e. i=1, 2, . . . , M, have been set to the identification number Ti of the battery unit to be charged. When the confirmation is successfully received, the sequence of the values of the identification number Ti, i.e. the pattern of selecting battery units to be charged, enables charging of the battery units to continue throughout the operation modes specified by the schedule without allowing a charge amount of any battery unit to exceed a corresponding boundary charge value.

Note that when a copy or scanning function is added to the image forming apparatus 100, the operation controller 80 may switch operation modes of the image forming apparatus 100 between the additional functions and the above-described three types of operation mode. In this case, the table in FIG. 12A may have items indicating power generation potential of the generators added for each operating mode of the additional functions.

Further, the instructor 964 may reference a table indicating power generation potential of the generators in each of time periods such as morning, afternoon, night, and based on it, predict power generation amounts of the generators for each operation mode included in the schedule. For example, a power generation amount of the photovoltaic generator units may be predicted as "large" during the day when there is a lot of natural light, "medium" during working hours, and "small" from midnight until dawn.

(L) When the instructor 964 detects from the measured values of the measurer 962 that one of the conditions (1), (2), (3) has been met for considering that a reduction in charging current amount has occurred, the instructor 964 changes the battery unit to be charged. When there is a sufficiently high possibility of a charge amount of a battery unit to be charged reaching a corresponding boundary charge amount before switching of a given operation mode to another, the instructor 964 may also change a battery unit to be charged before the charge amount actually reaches the boundary charge amount. An example of such a case is that, among the operation modes indicated in the table of FIG. 12B, those for which the "large" amount of power generations are predicted include an operation mode of a long duration or a successive group.

(M) Types of rechargeable battery included in the battery units 97A-C may include lead-acid batteries, nickel-cadmium batteries, and other widely-known battery types in addition to nickel-metal hydride batteries and lithium ion secondary batteries. The battery units may further include fuel cells or capacitors. Further, battery type may be different for each battery unit. In this case, the charge control unit 96 may, when selecting a battery unit to be charged, check whether battery types included in the battery units having charge amounts less than corresponding boundary charge amounts are suitable for predicted values of power generation amounts of the generators.

Figure 14:
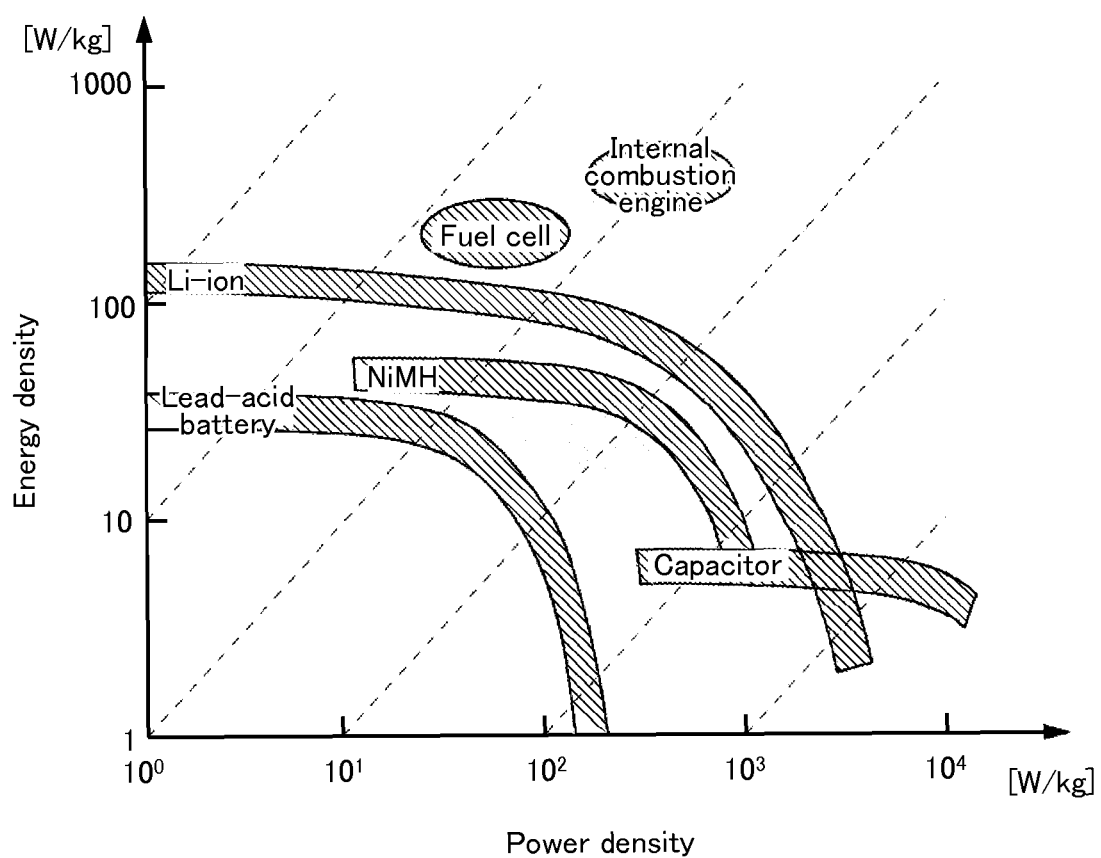
FIG. 14 is a graph (Ragone plot) illustrating the relationship between power density and energy density for various types of battery.

FIG. 14 is a graph (Ragone plot) illustrating the relationship between power density and energy density for various types of rechargeable battery. "Power density" of a battery is an amount of energy that the battery can input/output per unit time per unit weight. "Energy density" of a battery is an amount of energy that the battery can store per unit weight.

Referring to FIG. 14, capacitors have a higher power density than any of nickel-metal hydride batteries, lithium ion secondary batteries, and lead-acid batteries. This means that capacitors have a greater acceptance level for charging current than those batteries, i.e. capacitors allow charging at high currents. Accordingly, when predicting a high power generation amount of a generator, the charge control unit 96 sets a higher value to the target value of the charging current amount and selects a capacitor as a battery unit to be charged.

Referring again to FIG. 14, capacitors have lower energy density than other batteries. This means that capacitors have a lower boundary charge amount than other batteries. Accordingly, when predicting a high value of an amount of power generation of a generator times the duration of the power generation, the charge control unit 96 removes capacitors from candidates for a battery unit to be charged.

(N) The image forming apparatus 100 uses the thermoelectric generator units 401, 402, the photovoltaic generator unit 50, and the vibration-powered generator units 610, 620 to charge the battery units 97A-C. In this way, systems using energy harvesting may be present in a variety of forms, in electrical equipment other than image forming apparatuses, vehicles, heating equipment, etc. In such systems, enabling charge control devices similar to the above-described charge control unit 96 to use power from energy harvesting in charging battery devices is effective in improving use efficiency of the power.

Figure 15A:
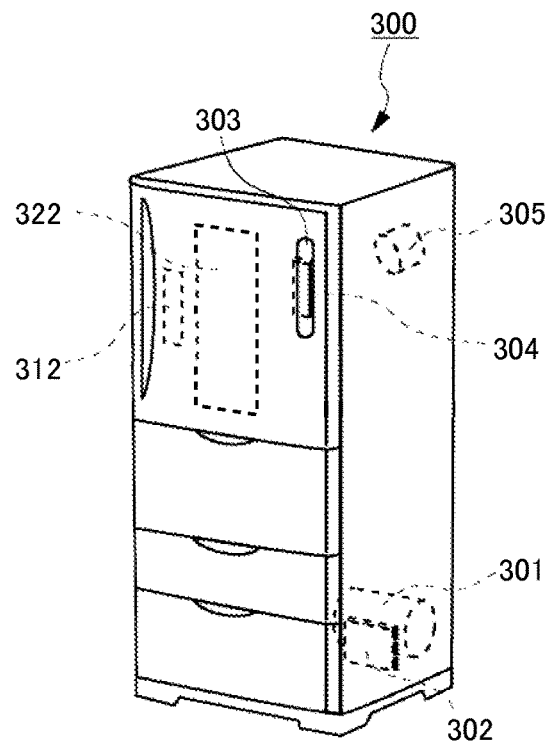
FIGS. 15A and 15B are perspective views of a refrigerator and vehicle, respectively, which use energy harvesting.

FIG. 15A is a perspective view of a refrigerator using energy harvesting. Referring to FIG. 15A, the refrigerator 300 includes a compressor 301, a thermoelectric generator device 302, a vibration-powered generator device 312, a photovoltaic generator device 322, an operation panel 303, and a fan 305. The compressor 301 compresses refrigerant to increase its pressure. The thermoelectric generator device 302 is located near the compressor 301 and uses a built-in thermoelectric transducer to convert waste heat from a surface of the compressor 301 into electrical power. The vibration-powered generator device 312 is embedded in a door of the refrigerator 300 and uses a built-in vibration transducer to convert vibrations accompanying opening and closing of the door into electrical power. The photovoltaic generator device 322 is located on a front face of the refrigerator 300 and used a built-in solar cell to convert natural and artificial light incident on the front face into electrical energy. The operation panel 303 is incorporated into the front face of a door of the refrigerator 300 and accepts setting information from user operations and displays the setting information on a screen. The setting information includes settings of refrigerator compartments, freezer compartments, etc., such as temperatures and cooling conditions for quick-freeze, etc. The fan 305 sends air cooled by the refrigerant to the refrigerator compartments and the freezer compartments.

The refrigerator 300 further includes a control device 304. The control device 304 is located behind the operation panel 303 and controls the compressor 301 according to the setting information accepted by the operation panel 303. The control device 304 contains a power control device, a charge control device, and a plurality of battery devices. The power control device and the charge control device cooperate to cause one of the battery devices to store power outputted from the generators 302, 312, 322. The charge control device in particular prevents charging loss by changing a battery device to be charged each time a charge amount of the battery device reaches a boundary charge amount. The battery devices supply power stored therein to loads such as the control device 304, the fan 305, interior lights, etc.

Figure 15B:
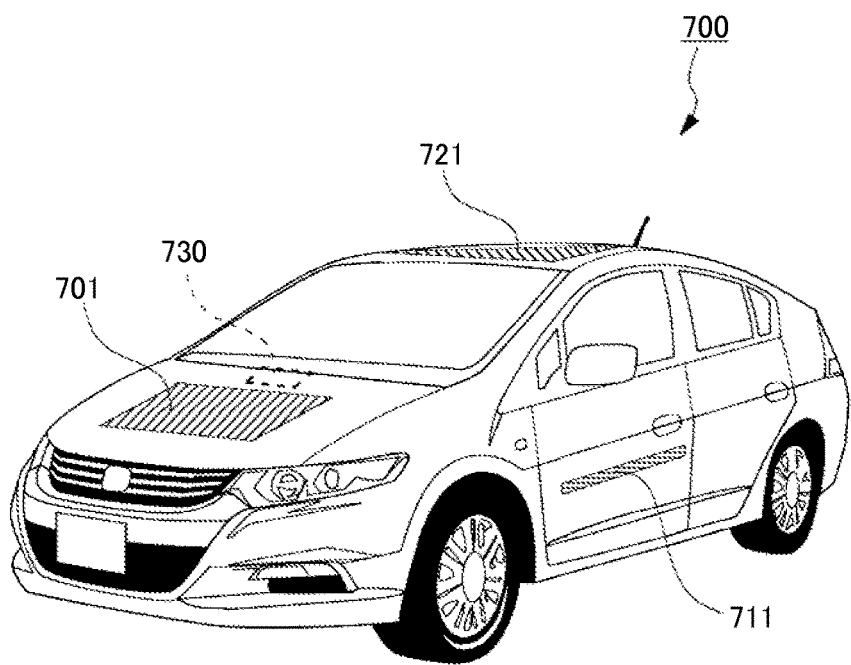

FIG. 15B is a perspective view of a vehicle using energy harvesting. Referring to FIG. 15B, the vehicle 700 includes a thermoelectric generator device 701, a vibration-powered generator device 711, a photovoltaic generator device 721, and an electronic control unit (ECU) 730 for energy harvesting. The thermoelectric generator device 701 is embedded in the bonnet of the vehicle 700 and uses a built-in thermoelectric transducer to convert heat from the engine into electrical power. The vibration-powered generator device 702 is embedded in a door and uses a built-in vibration transducer to convert vibrations accompanying travel of the vehicle 700 and opening and closing of the door into electrical power. The photovoltaic generator device 721 is located at the upper surface of the roof and uses a built-in solar cell to convert sunlight incident on the roof into electrical power. The ECU 730 for energy harvesting is located in the vehicle interior and contains a power control device, a charge control device, and a plurality of battery devices. The power control device and the charge control device cooperate to cause the battery devices to store power outputted from the generators 701, 711, 721. The charge control device in particular prevents charging loss by changing a battery device to be charged each time a charge amount of the battery device reaches a boundary charge amount. The battery devices supply power stored therein to other electronic devices mounted on the vehicle such as another ECU, etc.

In any of the systems illustrated in FIGS. 15A, 15B, the charge control device selects a battery device whose charge amount is less than a corresponding boundary charge amount as a battery device to be charged, based on a target value of charging current amount; when considering that the charging current amount flowing to the battery device has decreased during constant current charging, the charge control device changes a battery device to be charged.

In this way, the charge control device prevents the charge amounts of any of the battery devices from exceeding the boundary charge amount, thus enabling a reduction in charging loss caused by a decrease in charging current amount. This results in an increase in the ratio of the power amount stored in the battery devices to the power generation amounts of the generators, and therefore, in an actual increase in power generation efficiency thereof.

Energy harvesting may also be used in timepieces, mobile devices such as mobile phones, air-conditioning, household appliances such as lighting, transportation means such as motorbikes and ships, digital signage, illuminations, and sensor networks of buildings, factories, etc. In those systems, the charge control device of the present invention is effective in the same way as in the image forming apparatus 100 according to the above-described embodiment. In other words, the charge control device reduces charging loss causes by reduction of charging current amount to increase power generation efficiency of energy harvesting.

(O) Not being limited to energy harvesting, when a commercial power supply is used in charging of a battery device, charging loss occurs in the same way when an upper boundary is set for charging voltage in constant current charging. For example, in charging of a lithium ion secondary battery, an upper boundary is set to the charging voltage in order to prevent deterioration and a reduction in safety of the battery due to overcharging. Charging of a lithium ion secondary battery typically aims to achieve a full charge of the battery, and therefore, when the charging voltage reaches the upper boundary during the constant current charging, the charging of the battery switches to a constant voltage scheme and then continues. Accordingly, charging loss does occur, caused by decrease of charging current amount during the constant voltage charging.

It is desirable to reduce the charging loss when energy conservation is considered to be of greater importance than achieving the full charge. In such a case, the charge control device according to the present invention can reduce the charging loss by changing a battery device to be charged among a plurality of the battery devices so that the charge amounts thereof do not exceed boundary charge amounts.

Supplement

The charge control device according to the above embodiment of the present invention, while supplying output current of a constant current source to one battery device, monitors an actual amount of current flowing from said constant current source to the one battery device and, when a reduction of charging current amount is regarded as having occurred, changes a destination to which the output current of the constant current source is supplied to a different battery device. In this way, said charge control device reduces charging loss caused by a reduction in charging current amount.

Based on the above embodiment, the present invention may be characterized as follows.

In the charge control device according to an aspect of the present invention, an instructor monitors a measured value provided by a measurer and instructs a selector, when the measured value meets a condition for a reduction of charging current amount to be regarded as having occurred, to change a destination to which the output current of the constant current source is supplied. The condition may be: that a difference between the measured value and a target value has increased to a threshold value despite the adjusting of the constant current source; that a rate of decrease of the measured value has risen to a threshold value despite the adjusting of the constant current source; or that the measured value has decreased to a threshold value despite the adjusting of the constant current source. In the above cases, the instructor may change the threshold value depending on the external electricity.

The instructor may store a boundary charge amount for each battery device of the plurality of battery devices, the boundary charge amount being a charge amount at which the reduction of charging current amount occurs at the battery device; and the instructor may monitor how much charge amount each battery device of the plurality of battery devices has by integrating the measured value, thus selecting from the plurality of battery devices as the different battery device a battery device that has a charge amount less than a corresponding boundary charge amount.

The instructor may store a boundary charge amount for each battery device of the plurality of battery devices, the boundary charge amount being a charge amount at which the reduction of charging current amount occurs at the battery device and being associated with a target value to which the constant current source can set its output current amount; and when predicting that the external electricity will change, the instructor may estimate respective charge amounts of the plurality of battery devices at the time of the change, and anticipate that a candidate for the different battery device is a battery device whose estimated charge amount is less than its corresponding boundary charge amount associated with a target value to which the constant current source will set its output current amount from the time of the change.

The external electricity may be electricity that an energy harvesting device generates depending on ambient conditions of a system into which the energy harvesting device is embedded; and the instructor may predict the changing of the external electricity from a change in ambient conditions of the system. Further, the instructor may acquire a schedule of changes in operation mode from the system to use the schedule to estimate the change in ambient conditions of the system. Further, the instructor, when predicting that the external electricity will change multiple times in succession, may estimate that the different battery device meets a condition at a time of each change. The condition may be that, at the time of each change, any battery device selected as the different battery device has a charge amount whose estimated value is less than its corresponding boundary change amount associated with a target value to which the constant current source will set its output current amount during a period from the time of the change until the time of a subsequent change.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A charge control device for charging a plurality of battery devices by using external electricity, comprising:
   a constant current source configured to use the external electricity to generate and adjust an output current amount to a constant target value;
   a selector configured to select one battery device from the plurality of battery devices and to supply output current of the constant current source to the one battery device;
   a measurer configured to measure an amount of actual current flowing from the constant current source to the one battery device; and
   an instructor configured to monitor a measured value provided by the measurer and to instruct the selector, when the measured value meets a condition for a reduction of charging current amount to be regarded as having occurred, to change a destination to which the output current of the constant current source is supplied from the one battery device to a different battery device;
   wherein the condition is that the difference between the measured value and the target value has increased to a threshold value despite the adjusting of the constant current source, and the instructor changes the threshold value depending on the external electricity.

2. The charge control device according to claim 1 wherein:
   the instructor stores a boundary charge amount for each battery device of the plurality of battery devices, the boundary charge amount being a charge amount at which the reduction of charging current amount occurs at the battery device; and
   the instructor monitors how much charge amount each battery device of the plurality of battery devices has by integrating the measured value, thus selecting from the plurality of battery devices as the different battery device a battery device that has a charge amount less than a corresponding boundary charge amount.

3. The charge control device according to claim 1 wherein:
   the instructor stores a boundary charge amount for each battery device of the plurality of battery devices, the boundary charge amount being a charge amount at which the reduction of charging current amount occurs at the battery device and being associated with a target value to which the constant current source can set its output current amount; and
   when predicting that the external electricity will change, the instructor estimates respective charge amounts of the plurality of battery devices at the time of the change, and anticipates that a candidate for the different battery device is a battery device whose estimated charge amount is less than its corresponding boundary charge amount associated with a target value to which the constant current source will set its output current amount from the time of the change.

4. The charge control device according to claim 3 wherein:
   the external electricity is electricity that an energy harvesting device generates depending on ambient conditions of a system into which the energy harvesting device is embedded; and
   the instructor predicts the changing of the external electricity from a change in ambient conditions of the system.

5. The charge control device according to claim 4 wherein the instructor acquires a schedule of changes in operation mode from the system to use the schedule to estimate the change in ambient conditions of the system.

6. The charge control device according to claim 5 wherein:

the instructor, when predicting that the external electricity will change multiple times in succession, estimates that the different battery device meets a condition at a time of each change; and the condition is that, at the time of each change, any battery device selected as the different battery device has a charge amount whose estimated value is less than its corresponding boundary charge amount associated with a target value to which the constant current source will set its output current amount during a period from the time of the change until the time of a subsequent change.

7. A charge control device for charging a plurality of battery devices by using external electricity, comprising:
a constant current source configured to use the external electricity to generate and adjust an output current amount to a constant target value;
a selector configured to select one battery device from the plurality of battery devices and to supply output current of the constant current source to the one battery device;
a measurer configured to measure an amount of actual current flowing from the constant current source to the one battery device; and
an instructor configured to monitor a measured value provided by the measurer and to instruct the selector, when the measured value meets a condition for a reduction of charging current amount to be regarded as having occurred, to change a destination to which the output current of the constant current source is supplied from the one battery device to a different battery device;
wherein the condition is that a rate of decrease of the measured value has risen to a threshold value despite the adjusting of the constant current source, and the instructor changes the threshold value depending on the external electricity.

8. The charge control device according to claim 7 wherein:
the instructor stores a boundary charge amount for each battery device of the plurality of battery devices, the boundary charge amount being a charge amount at which the reduction of charging current amount occurs at the battery device; and
the instructor monitors how much charge amount each battery device of the plurality of battery devices has by integrating the measured value, thus selecting from the plurality of battery devices as the different battery device a battery device that has a charge amount less than a corresponding boundary charge amount.

9. The charge control device according to claim 7 wherein:
the instructor stores a boundary charge amount for each battery device of the plurality of battery devices, the boundary charge amount being a charge amount at which the reduction of charging current amount occurs at the battery device and being associated with a target value to which the constant current source can set its output current amount; and
when predicting that the external electricity will change, the instructor estimates respective charge amounts of the plurality of battery devices at the time of the change, and anticipates that a candidate for the different battery device is a battery device whose estimated charge amount is less than its corresponding boundary charge amount associated with a target value to which the constant current source will set its output current amount from the time of the change.

10. The charge control device according to claim 9 wherein:
the external electricity is electricity that an energy harvesting device generates depending on ambient conditions of a system into which the energy harvesting device is embedded; and
the instructor predicts the changing of the external electricity from a change in ambient conditions of the system.

11. The charge control device according to claim 10 wherein the instructor acquires a schedule of changes in operation mode from the system to use the schedule to estimate the change in ambient conditions of the system.

12. The charge control device according to claim 11 wherein:
the instructor, when predicting that the external electricity will change multiple times in succession, estimates that the different battery device meets a condition at a time of each change; and
the condition is that, at the time of each change, any battery device selected as the different battery device has a charge amount whose estimated value is less than its corresponding boundary charge amount associated with a target value to which the constant current source will set its output current amount during a period from the time of the change until the time of a subsequent change.

13. A charge control device for charging a plurality of battery devices by using external electricity, comprising:
a constant current source configured to use the external electricity to generate and adjust an output current amount to a constant target value;
a selector configured to select one battery device from the plurality of battery devices and to supply output current of the constant current source to the one battery device;
a measurer configured to measure an amount of actual current flowing from the constant current source to the one battery device; and
an instructor configured to monitor a measured value provided by the measurer and to instruct the selector, when the measured value meets a condition for a reduction of charging current amount to be regarded as having occurred, to change a destination to which the output current of the constant current source is supplied from the one battery device to a different battery device;
wherein the condition is that the measured value has decreased to a threshold value despite the adjusting of the constant current source, and the instructor changes the threshold value depending on the external electricity.

14. The charge control device according to claim 13 wherein:
the instructor stores a boundary charge amount for each battery device of the plurality of battery devices, the boundary charge amount being a charge amount at which the reduction of charging current amount occurs at the battery device; and
the instructor monitors how much charge amount each battery device of the plurality of battery devices has by integrating the measured value, thus selecting from the plurality of battery devices as the different battery device a battery device that has a charge amount less than a corresponding boundary charge amount.

15. The charge control device according to claim 13 wherein:
the instructor stores a boundary charge amount for each battery device of the plurality of battery devices, the boundary charge amount being a charge amount at which the reduction of charging current amount occurs at the battery device and being associated with a target value to which the constant current source can set its output current amount; and when predicting that the external electricity will change, the instructor estimates respective charge amounts of the plurality of battery devices at the time of the change, and anticipates that a candidate for the different battery device is a battery device whose estimated charge amount is less than its corresponding boundary charge amount associated with a target value to which the constant current source will set its output current amount from the time of the change.

16. The charge control device according to claim 15 wherein:

the external electricity is electricity that an energy harvesting device generates depending on ambient conditions of a system into which the energy harvesting device is embedded; and the instructor predicts the changing of the external electricity from a change in ambient conditions of the system.

17. The charge control device according to claim 16 wherein the instructor acquires a schedule of changes in operation mode from the system to use the schedule to estimate the change in ambient conditions of the system.

18. The charge control device according to claim 17 wherein:

the instructor, when predicting that the external electricity will change multiple times in succession, estimates that the different battery device meets a condition at a time of each change; and the condition is that, at the time of each change, any battery device selected as the different battery device has a charge amount whose estimated value is less than its corresponding boundary charge amount associated with a target value to which the constant current source will set its output current amount during a period from the time of the change until the time of a subsequent change.

* * * * *